United States Patent
Dube et al.

(10) Patent No.: US 10,503,551 B2
(45) Date of Patent: Dec. 10, 2019

(54) COORDINATING FPGA SERVICES USING CASCADED FPGA SERVICE MANAGERS

(71) Applicant: Dell Products L.P., Round Rock, TX (US)

(72) Inventors: Shawn Joel Dube, Austin, TX (US); Andrew Butcher, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 128 days.

(21) Appl. No.: 15/616,715

(22) Filed: Jun. 7, 2017

(65) Prior Publication Data

US 2018/0357098 A1 Dec. 13, 2018

(51) Int. Cl.
*G06F 9/50* (2006.01)
*G06F 9/455* (2018.01)

(52) U.S. Cl.
CPC ........ *G06F 9/5005* (2013.01); *G06F 9/45558* (2013.01); *G06F 2009/45579* (2013.01)

(58) Field of Classification Search
None
See application file for complete search history.

(56) References Cited

U.S. PATENT DOCUMENTS

| | | | | |
|---|---|---|---|---|
| 7,734,895 B1 * | 6/2010 | Agarwal | ................... | G06F 8/52 712/13 |
| 7,882,307 B1 * | 2/2011 | Wentzlaff | ............ | G06F 12/0813 711/119 |
| 8,095,929 B1 * | 1/2012 | Ji | .......................... | G06F 9/4856 709/223 |
| 9,237,165 B2 * | 1/2016 | Fine | ..................... | H04L 63/1441 |
| 9,378,043 B1 * | 6/2016 | Zhang | ................. | G06F 9/45558 |
| 10,013,212 B2 * | 7/2018 | Zheng | .................. | G06F 3/0613 |
| 10,037,222 B2 * | 7/2018 | Bolic | .................. | G06F 9/45558 |
| 10,048,977 B2 * | 8/2018 | Palermo | ............. | G06F 9/45558 |
| 10,069,681 B2 * | 9/2018 | Izenberg | ............. | G06F 9/45558 |
| 10,120,798 B1 | 11/2018 | Smith | | |

(Continued)

OTHER PUBLICATIONS

Eguro, Ken, and Ramarathnam Venkatesan. "FPGAs for trusted cloud computing." 22nd International Conference on Field Programmable Logic and Applications (FPL). IEEE, 2012. (Year: 2012).*

(Continued)

*Primary Examiner* — Matthew J Brophy
(74) *Attorney, Agent, or Firm* — Baker Botts L.L.P.

(57) ABSTRACT

An information handling system may include a field-programmable gate array (FPGA), and a hypervisor to manage virtual machines. The hypervisor may host a first FPGA service manager that loads instances of binary images for FPGA services into respective regions of the FPGA for the benefit of software applications. The virtual machine may host a second FPGA service manager that receives a request for an FPGA service from a software application running in the virtual machine, and sends a query to the first FPGA service manager to determine whether a binary image for the FPGA service exists on the FPGA. The first FPGA service manager may receive the query and, if a binary image instance for the FPGA service exists on the FPGA, may provide information to the second FPGA service manager to facilitate the use of the FPGA service by the software application running in the virtual machine.

20 Claims, 12 Drawing Sheets

(56) References Cited

U.S. PATENT DOCUMENTS

| | | | | |
|---|---|---|---|---|
| 2008/0235756 | A1* | 9/2008 | Cohen | G06F 9/45533 726/1 |
| 2009/0187756 | A1* | 7/2009 | Nollet | G06F 15/7867 713/100 |
| 2011/0093849 | A1* | 4/2011 | Chawla | H04L 41/0816 718/1 |
| 2013/0205295 | A1* | 8/2013 | Ebcioglu | G06F 9/45533 718/1 |
| 2015/0128268 | A1* | 5/2015 | Fine | H04L 63/1441 726/23 |
| 2015/0169376 | A1 | 6/2015 | Chang | |
| 2015/0304459 | A1* | 10/2015 | Pakula | H04L 67/02 709/203 |
| 2016/0170793 | A1* | 6/2016 | Decusatis | G06F 9/45558 718/1 |
| 2016/0210167 | A1* | 7/2016 | Bolic | G06F 9/45558 |
| 2016/0246653 | A1* | 8/2016 | Ebcioglu | G06F 9/45533 |
| 2016/0321113 | A1* | 11/2016 | Pinto | G06F 9/45533 |
| 2017/0075706 | A1* | 3/2017 | Apfelbaum | G06F 9/4856 |
| 2017/0126487 | A1* | 5/2017 | Xie | H04L 41/082 |
| 2017/0153854 | A1* | 6/2017 | Zheng | G06F 3/0613 |
| 2017/0177396 | A1* | 6/2017 | Palermo | G06F 9/45558 |
| 2017/0195173 | A1* | 7/2017 | Izenberg | G06F 9/45558 |
| 2017/0264680 | A1 | 9/2017 | Palermo | |
| 2018/0004564 | A1* | 1/2018 | Konishi | G06F 3/0647 |
| 2018/0088992 | A1* | 3/2018 | Davis | G06F 9/5077 |
| 2018/0095774 | A1* | 4/2018 | Atta | G06F 9/45558 |
| 2018/0173548 | A1* | 6/2018 | Schoenberg | G06F 9/45558 |
| 2018/0196951 | A1* | 7/2018 | Hoppert | G06F 21/604 |
| 2018/0205553 | A1* | 7/2018 | Hoppert | H04L 9/3247 |
| 2018/0213669 | A1* | 7/2018 | Kochukunju | H05K 7/1485 |
| 2018/0253320 | A1* | 9/2018 | Emejulu | G06F 9/45558 |
| 2018/0255157 | A1 | 9/2018 | Butcher et al. | |
| 2018/0300165 | A1 | 10/2018 | Johnson | |
| 2018/0357090 | A1* | 12/2018 | Butcher | G06F 9/45558 |
| 2018/0357098 | A1* | 12/2018 | Dube | G06F 9/5005 |

OTHER PUBLICATIONS

Nasiri, Hamid, and Maziar Goudarzi. "Dynamic fpga-accelerator sharing among concurrently running virtual machines." 2016 IEEE East-West Design & Test Symposium (EWDTS). IEEE, 2016. (Year: 2016).*

Charitopoulos, George, et al. "Hardware task scheduling for partially reconfigurable FPGAs." International Symposium on Applied Reconfigurable Computing. Springer International Publishing, 2015; 12 pages, 2015.

An, Xin, et al. "Autonomic Management of Dynamically Partially Reconfigurable FPGA Architectures Using Discrete Control." ICAC. 2013; 5 pages, 2013.

Wheeler, David A. "3. Shared Libraries," Program Library HOWTO, Apr. 11, 2003; 8 pages, Apr. 11, 2003.

Wikipedia, the Free Encyclopedia, Mar. 30, 2017. https://en.wikipedia.org/wiki/Executable_and_Linkable_Format; 15 pages, Mar. 30, 2017.

Xilinx BIT bitstream files, retrieved on Mar. 30, 2017. http://www.pldtool.com/pdf/fmt_xilinxbit.pdf; 1 page, Mar. 30, 2017.

* cited by examiner

400

| SERVICE NAME 410 | | |
|---|---|---|
| REVISION 412 | BACKWARD COMPATIBILITY 414 | |
| CONCURRENT COUNT MAXIMUM 416 | QUEUE HIGH THRESHOLD 418 | MAXIMUM BANDWIDTH 420 |
| FPGA/CPU CLASS TAG 432-1 | BINARY IMAGE 430-1 | |
| PERFORMANCE/CAPABILITY INFORMATION 433-1 | | |
| FPGA/CPU CLASS TAG 432-2 | BINARY IMAGE 430-2 | |
| PERFORMANCE/CAPABILITY INFORMATION 433-2 | | |
| FPGA/CPU CLASS TAG 432-3 | BINARY IMAGE 430-3 | |
| PERFORMANCE/CAPABILITY INFORMATION 433-3 | | |

FIG. 4

COORDINATING FPGA SERVICES USING CASCADED FPGA SERVICE MANAGERS

BACKGROUND

Field of the Disclosure

This disclosure relates generally to information handling systems and, more particularly, to coordinating FPGA services using cascaded FPGA service managers.

Description of the Related Art

As the value and use of information continues to increase, individuals and businesses seek additional ways to process and store information. One option available to users is information handling systems. An information handling system generally processes, compiles, stores, and communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Increasingly, information handling systems are deployed in architectures that allow multiple operating systems to run on a single information handling system. Labeled "virtualization," this type of information handling system architecture decouples software from hardware and presents a logical view of physical hardware to software. In a virtualized information handling system, a single physical server may instantiate multiple, independent virtual servers. Server virtualization is enabled primarily by a piece of software (often referred to as a "hypervisor") that provides a software layer between the server hardware and the multiple operating systems, also referred to as guest operating systems (guest OS). The hypervisor software provides a container that presents a logical hardware interface to the guest operating systems. An individual guest OS, along with various applications or other software executing under the guest OS, may be unaware that execution is occurring in a virtualized server environment (as opposed to a dedicated physical server). Such an instance of a guest OS executing under a hypervisor may be referred to as a "virtual machine". Virtual machines may be managed by a virtual machine manager, such as, for example, a hypervisor.

Adoption of the use of Field Programmable Gate Arrays (FPGAs) as computing accelerators has been relatively slow for the mass market and has primarily been taken on by specialized niche applications, such as for high frequency trading. However, FPGA usage in the enterprise space, particularly with servers, is becoming more prevalent. To date, this usage has typically been focused on a model in which each FPGA device provides a single service that is targeted to a specific application or process. Recent evidence indicates that the use of FPGAs as computing accelerators is likely to increase, and that FPGAs may be increasingly available in hosted cloud computing environments.

SUMMARY

In one aspect, a disclosed information handling system includes a first field-programmable gate array (FPGA), and a hypervisor configured to manage a first virtual machine operating on the information handling system. The hypervisor may host a first FPGA service manager configured to load instances of binary images for FPGA services into respective regions of the first FPGA for the benefit of software applications running in the information handling system. The first virtual machine may host a second FPGA service manager configured to receive a request for a first FPGA service on behalf of a software application running in the first virtual machine, and to send a first query to the first FPGA service manager to determine whether a binary image instance for the first FPGA service has been loaded on the first FPGA. The first FPGA service manager may be further configured to receive the first query, and in response to a determination that a binary image instance for the first FPGA service has been loaded on the first FPGA, to provide information to the second FPGA service manager to facilitate the use of the first FPGA service by the software application running in the first virtual machine.

In any of the disclosed embodiments, the information handling system may further include an FPGA appliance. The FPGA appliance may include a second FPGA, and a third FPGA service manager configured to load instances of binary images for FPGA services into respective regions of the second FPGA. In response to a determination that no binary image instance for the first FPGA service has been loaded on the first FPGA, the first FPGA service manager may be further configured to send a second query to the third FPGA service manager to determine whether a binary image instance for the first FPGA service has been loaded on the second FPGA. The third FPGA service manager may be further configured to receive the second query, and in response to a determination that a binary image instance for the first FPGA service has been loaded on the second FPGA, to provide information to the first FPGA service manager to facilitate the use of the first FPGA service by the software application running in the first virtual machine. In response to receiving the information from the third FPGA service manager, the first FPGA service manager may be further configured to provide information to the second FPGA service manager to facilitate the use of the first FPGA service by the software application running in the first virtual machine.

In any of the disclosed embodiments, in response to a determination that no binary image instance for the first FPGA service has been loaded on the second FPGA, the first FPGA service manager and the third FPGA service manager may be configured to determine, using a voting mechanism, the one of the first FPGA and the second FPGA on which a binary image instance for the first FPGA service is to be instantiated.

In any of the disclosed embodiments, the voting mechanism may include determining, by the first FPGA service manager, a score for the first FPGA based on an opportunity cost of loading a binary image instance for the first FPGA service into the first FPGA, determining, by the third FPGA service manager, a score for the second FPGA based on an opportunity cost of loading a binary image instance for the first FPGA service into the second FPGA, and comparing the scores for the first FPGA and the second FPGA. In response to a determination that the first FPGA has better score than the second FPGA, the first FPGA service manager may be configured to load a binary image instance for the first FPGA service into a region of the first FPGA, and in response to a determination that the second FPGA has better score than the first FPGA, the third FPGA service manager may be configured to load a binary image instance for the first FPGA service into a region of the second FPGA.

In any of the disclosed embodiments, the FPGA appliance may further include at least one additional FPGA, and the third FPGA service manager may be further configured to load instances of binary images for FPGA services into respective regions of the additional FPGA.

In any of the disclosed embodiments, the first FPGA, the first virtual machine, and the hypervisor may be implemented on a server. The hypervisor may be further configured to manage one or more additional virtual machines implemented on the server, each of which hosts a respective FPGA service manager configured to receive requests for FPGA services on behalf of software applications running in the virtual machine, and send queries to the first FPGA service manager to determine whether binary image instances for the requested FPGA services have been loaded on the first FPGA.

In any of the disclosed embodiments, the hypervisor may be configured to send a request to the first FPGA service manager indicating that the first virtual machine is to be migrated from a first physical machine to a second physical machine. The first FPGA service manager may be configured to identify the first FPGA service as an FPGA service that is in use by the software application running on the first virtual machine, and to notify the second FPGA service manager that the first virtual machine is to be migrated from the first physical machine to a second physical machine. The second FPGA service manager may be configured to instantiate, in a memory in response to the notification, a software version of the first FPGA service to be executed by a processor of the information handling system, and to direct requests by the software application for tasks of the first FPGA service to the software version of the first FPGA.

In any of the disclosed embodiments, the second FPGA service manager may be configured to instantiate, in a memory in response to predetermined criteria for offloading the first FPGA service to a processor of the information handling system being met, a software version of the first FPGA service to be executed by the processor, and to direct requests by the software application for tasks of the first FPGA service to the software version of the first FPGA. The predetermined criteria may be dependent on a performance constraint or a resource utilization constraint.

In another aspect, a disclosed method is for coordinating FPGA services using cascaded FPGA service managers. The method may include hosting, by a hypervisor that manages a first virtual machine, a first FPGA service manager, hosting, by the first virtual machine, a second FPGA service manager, receiving, by the second FPGA service manager, a request for a first FPGA service on behalf of a software application running in the first virtual machine, sending, by the second FPGA service manager to the first FPGA service manager, a first query to determine whether a binary image instance for the first FPGA service has been loaded on a first FPGA, receiving, by the first FPGA service manager, the first query, and providing, by the first FPGA service manager to the second FPGA service manager in response to a determination that a binary image instance for the first FPGA service has been loaded on the first FPGA, information to facilitate the use of the first FPGA service by the software application running in the first virtual machine.

In any of the disclosed embodiments, the method may further include receiving, by the second FPGA service manager, a request for a second FPGA service on behalf of the software application running in the first virtual machine, sending, by the second FPGA service manager to the first FPGA service manager, a second query to determine whether a binary image instance for the second FPGA service has been loaded on the first FPGA, receiving, by the first FPGA service manager, the second query, sending, by the first FPGA service manager to a third FPGA service manager of an FPGA appliance comprising a second FPGA in response to a determination that no binary image instance for the second FPGA service has been loaded on the first FPGA, a second query to determine whether a binary image instance for the second FPGA service has been loaded on the second FPGA, receiving, by the third FPGA service manager, the second query, providing, by the third FPGA service manager to the first FPGA service manager in response to a determination that a binary image instance for the second FPGA service has been loaded on the second FPGA, information to facilitate the use of the second FPGA service by the software application running in the first virtual machine, and providing, by the first FPGA service manager to the second FPGA service manager in response to receiving the information from the third FPGA service manager, information to facilitate the use of the second FPGA service by the software application running in the first virtual machine.

In any of the disclosed embodiments, the method may further include receiving, by the second FPGA service manager, a request for a second FPGA service on behalf of the software application running in the first virtual machine, sending, by the second FPGA service manager to the first FPGA service manager, a second query to determine whether a binary image instance for the second FPGA service has been loaded on the first FPGA, receiving, by the first FPGA service manager, the second query, sending, by the first FPGA service manager to a third FPGA service manager of an FPGA appliance comprising a second FPGA in response to a determination that no binary image instance for the second FPGA service has been loaded on the first FPGA, a second query to determine whether a binary image instance for the second FPGA service has been loaded on the second FPGA, receiving, by the third FPGA service manager, the second query, and determining, by the first FPGA service manager and the third FPGA service manager in response to a determination that no binary image instance for the second FPGA service has been loaded on the second FPGA, the one of the first FPGA and the second FPGA on which a binary image instance for the second FPGA service is to be instantiated.

In any of the disclosed embodiments, determining the one of the first FPGA and the second FPGA on which a binary image instance for the second FPGA service is to be instantiated may include determining, by the first FPGA service manager, a score for the first FPGA based on an opportunity cost of loading a binary image instance for the second FPGA service into the first FPGA, determining, by the third FPGA service manager, a score for the second FPGA based on an opportunity cost of loading a binary image instance for the second FPGA service into the second FPGA, and comparing the scores for the first FPGA and the second FPGA. The method may further include loading a binary image instance for the second FPGA service into a region of the one of the first FPGA and the second FPGA having a better score.

In any of the disclosed embodiments, the first FPGA, the first virtual machine, a second virtual machine that hosts a third FPGA service manager, and the hypervisor may be implemented on a server. The method may further include receiving, by the third FPGA service manager, requests for FPGA services on behalf of software applications running in the second virtual machine, and sending, by the third FPGA service manager, queries to the first FPGA service manager to determine whether binary image instances for the requested FPGA services have been loaded on the first FPGA.

In any of the disclosed embodiments, the method may further include sending, by the hypervisor to the first FPGA service manager, a request indicating that the first virtual machine is to be migrated from a first physical machine to a second physical machine, identifying, by the first FPGA service manager, the first FPGA service as an FPGA service that is in use by the software application running on the first virtual machine, notifying, by the first FPGA service manager, the second FPGA service manager that the first virtual machine is to be migrated from the first physical machine to a second physical machine, instantiating in a memory, by the second FPGA service manager in response to the notification, a software version of the first FPGA service to be executed by a processor, and directing requests by the software application for tasks of the first FPGA service to the software version of the first FPGA.

In any of the disclosed embodiments, the method may further include instantiating, by the second FPGA service manager in a memory in response to predetermined criteria for offloading the first FPGA service to a processor being met, a software version of the first FPGA service to be executed by the processor, and directing requests by the software application for tasks of the first FPGA service to the software version of the first FPGA. The predetermined criteria may be dependent on a performance constraint or a resource utilization constraint.

A further disclosed aspect includes a system including one or more processors and a memory subsystem storing instructions executable by the one or more processors. When executed by the one or more processors, the instructions may cause the one or more processors to implement a first field-programmable gate array (FPGA) service manager. The first FPGA service manager may include a first interface through which to communicate with a second FPGA service manager instantiated at a higher level in a software stack in the system than a level in the software stack at which the first FPGA service manager is instantiated, a binary image library in which to store binary images for FPGA services, and an FPGA device manager to load instances of binary images for FPGA services into respective regions of a first FPGA for the benefit of software applications executing in the system. The first FPGA service manager may be configured to receive a request for a first FPGA service on behalf of a first software application executing at the level in the software stack at which the first FPGA service manager is instantiated or at a level in the software stack below the level at which the first FPGA service manager is instantiated and, in response to a determination that a binary image instance for the first FPGA service has been loaded on the first FPGA, to facilitate the use of the first FPGA service by the first software application.

In any of the disclosed embodiments, the first FPGA service manager may further include a software provider interface to communicate with one or more software applications executing at the level in the software stack at which the first FPGA service manager is instantiated. The first software application may execute at the level in the software stack at which the first FPGA service manager is instantiated. The request for the first FPGA service may be received from the first software application through the software provider interface.

In any of the disclosed embodiments, the first FPGA service manager may further include a second interface through which to communicate with a third FPGA service manager instantiated at a lower level in a software stack in the system than the level in the software stack at which the first FPGA service manager is instantiated. The request for the first FPGA service may be received from the third FPGA service manager on behalf of the first software application through the second interface.

In any of the disclosed embodiments, the first FPGA service manager may be instantiated within a hypervisor that manages a first virtual machine, the third FPGA service manager may be instantiated within the first virtual machine, and the first software application may execute within the first virtual machine.

In any of the disclosed embodiments, the first FPGA service manager may be instantiated within an operating system, the second FPGA service manager may be instantiated in an FPGA appliance that includes the first FPGA, and the first software application may execute within a container provided by the operating system.

BRIEF DESCRIPTION OF THE DRAWINGS

For a more complete understanding of the present invention and its features and advantages, reference is now made to the following description, taken in conjunction with the accompanying drawings, in which:

FIG. 4 illustrates selected elements of an embodiment of an FPGA service catalog;

DESCRIPTION OF PARTICULAR EMBODIMENT(S)

Figure 1:
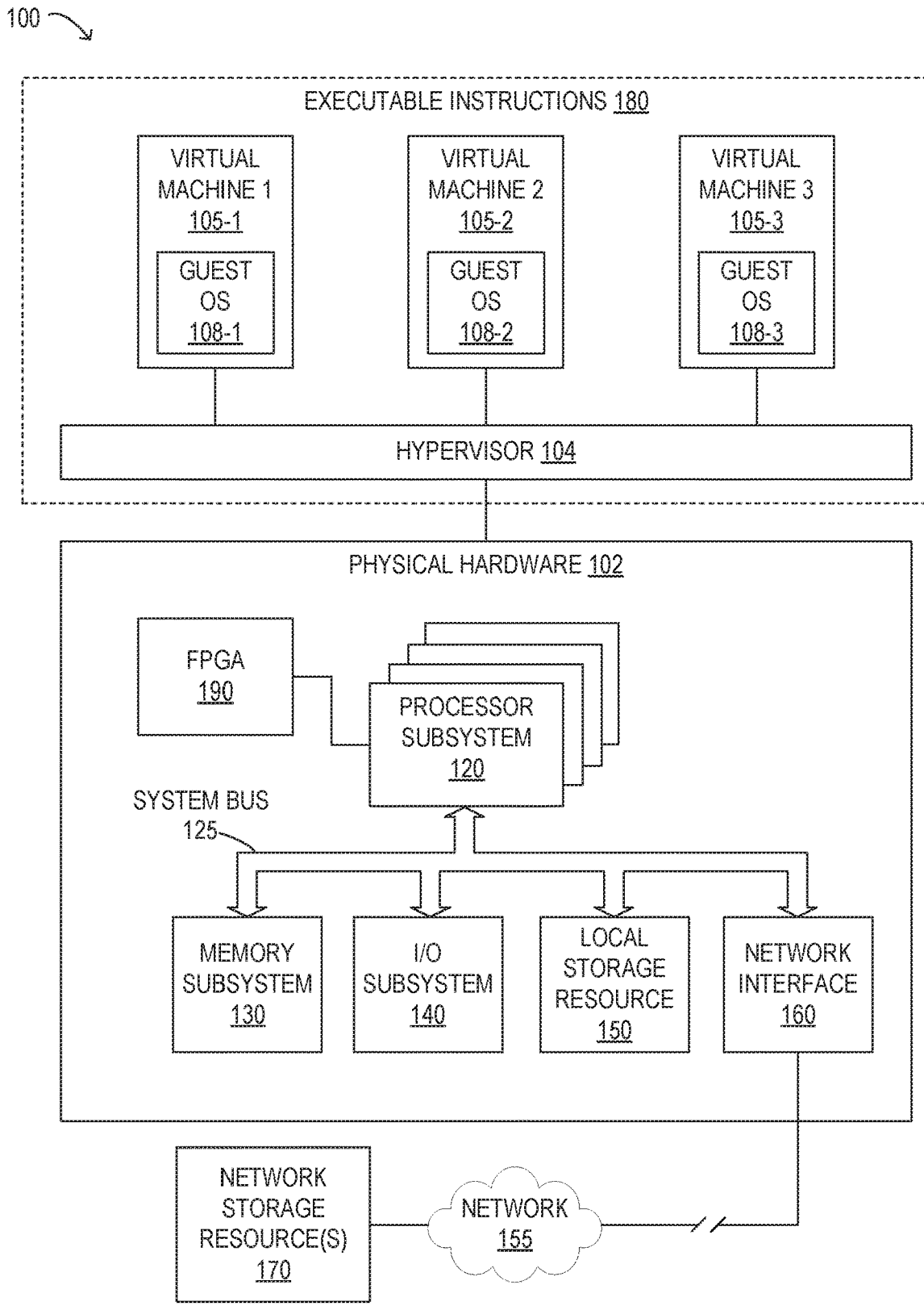
FIG. 1 is a block diagram illustrating selected elements of an embodiment of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72".

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. In various embodiments, information handling system 100 may represent a personal computing device, such as a personal computer system, a desktop computer, a laptop computer, a notebook computer, a PDA, a consumer electronic device, or another suitable device operated by a user. In other embodiments, an information handling system may represent a mainframe computer, such as a computer operating as a server or configured for shared use by multiple concurrent users, a network storage device, or another suitable device. Information handling systems may vary in size, shape, performance, functionality, and price, in different embodiments. An information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor described more fully below may comprise firmware. As used in this disclosure, the term "firmware" may refer to software embedded in an information handling system component used to perform predefined tasks. Firmware is commonly stored in non-volatile memory, or memory that does not lose stored data upon the loss of power. In certain embodiments, firmware associated with an information handling system component may be stored in non-volatile memory that is accessible to one or more information handling system components. In the same or alternative embodiments, firmware associated with an information handling system component may be stored in non-volatile memory that is dedicated to and comprises part of that component. For example, in some embodiments, BIOS firmware which may implement the Basic Input/Output System (BIOS) firmware interface, may represent pre-boot instructions executable by a processor subsystem of an information handling system for preparing the information handling system to boot by activating various hardware components in preparation of launching an operating system for execution.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), flash memory (SSD); as well as communications media such wires, optical fibers, microwaves, radio waves, and other electromagnetic or optical carriers; or any combination of the foregoing.

As will be described in further detail, the inventors of the present disclosure have developed systems and methods disclosed herein for managing shared services in reconfigurable regions of an FPGA included in, or coupled to, an information handling system that implements virtualization technology. As noted previously, virtualization enables multiple workloads to run on a single physical machine. In at least some embodiments, such a system may include an FPGA and an FPGA service manager, within a hypervisor, that manages the loading of multiple bitstreams, each implementing an FPGA service on behalf of one or more software applications executing in virtual machines in the system, into respective reconfigurable regions of the FPGA and the reclamation of regions of the FPGA when they are no longer needed. As used herein, the term "FPGA service" may refer to a service provided to a software application by a bitstream loaded on an FPGA. In certain embodiments, an information handling system may include multiple cascaded FPGA service managers that cooperate to provide FPGA services to software applications executing on the system from FPGAs that are local to the servers in the system or from FPGAs of a separate FPGA appliance.

Particular embodiments are best understood by reference to FIGS. 1-12, in which like numbers are used to indicate like and corresponding parts.

Turning now to the drawings, FIG. 1 illustrates a block diagram depicting selected elements of an embodiment of information handling system 100. It is noted that FIG. 1 is not drawn to scale but is a schematic illustration. As depicted in FIG. 1, information handling system 100 may include physical hardware 102, and executable instructions 180 (including a hypervisor 104 and one or more virtual machines 105). Also shown with information handling system 100 are external or remote elements, namely, network 155 and network storage resource(s) 170.

As shown in FIG. 1, components of information handling system 100 may include, but are not limited to, a processor subsystem 120, which may comprise one or more processors, and system bus 125 that communicatively couples various system components to processor subsystem 120 including, for example, a memory subsystem 130, an I/O subsystem 140, local storage resource 150, and a network interface 160. System bus 125 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express (PCIe) bus, HyperTransport (HT) bus, and Video Electronics Standards Association (VESA) local bus.

In FIG. 1, network interface 160 may be a suitable system, apparatus, or device operable to serve as an interface between information handling system 100 and network 155. Network interface 160 may enable information handling system 100 to communicate over network 155 using a suitable transmission protocol or standard, including, but not limited to, transmission protocols or standards enumerated below with respect to the discussion of network 155. In some embodiments, network interface 160 may be communicatively coupled via network 155 to a network storage resource 170. The network 155 coupled to network interface 160 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and messages (generally referred to as data). The network 155 coupled to network interface 160 may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), or any combination thereof. The network 155 coupled to network interface 160 or various components associated therewith may be implemented using hardware, software, or any combination thereof.

As depicted in FIG. 1, processor subsystem 120 may comprise a system, device, or apparatus operable to interpret and/or execute program instructions and process data, and may include a microprocessor, microcontroller, digital signal processor (DSP), application specific integrated circuit (ASIC), or another digital or analog circuitry configured to interpret and execute program instructions and process data. In some embodiments, processor subsystem 120 may interpret and execute program instructions and process data stored locally (e.g., in memory subsystem 130 or local storage resource 150). In the same or alternative embodiments, processor subsystem 120 may interpret and execute program instructions and process data stored remotely (e.g., in network storage resources 170).

In some embodiments, a memory subsystem within processor subsystem 120 may include multiple data caches, such as one or more level 1 (L1) caches and/or level 2 (L2) caches (not shown). For example, a level 1 cache may be local to a particular processor or processor core within processor subsystem 120, and a level 2 cache may be shared between multiple processors or processor cores within a processor subsystem 120. In some embodiments of the present disclosure, one or more of these caches may be implemented as write-back caches. In such embodiments, the modified contents of the write-back caches may be written out to persistent memory (e.g., a non-volatile memory within memory subsystem 130 or local storage resource 150) under certain circumstances. A cache controller within a memory subsystem of processor subsystem 120 may include circuitry to manage the contents of one or more L1 caches and/or L2 caches. For example, a cache controller may include circuitry to determine when and if an individual cache line or a group of cache lines should be flushed to persistent memory (such as a solid-state storage device within local storage resource 150 or network storage resource 170) or otherwise evicted from one of the caches in accordance with a predetermined cache line replacement policy.

Also in FIG. 1, memory subsystem 130 may comprise a system, device, or apparatus operable to retain and retrieve program instructions and data for a period of time (e.g., computer-readable media). Memory subsystem 130 may comprise random access memory (RAM), electrically erasable programmable read-only memory (EEPROM), a PCM-CIA card, flash memory, magnetic storage, opto-magnetic storage, or a suitable selection or array of volatile or non-volatile memory that retains data after power is removed. In some embodiments, memory subsystem 130 may include a level 3 (L3) cache or a last-level cache (not shown), which may be shared between processors or processor cores in multiple processor subsystems 120. Local storage resource 150 may comprise computer-readable media (e.g., hard disk drive, floppy disk drive, CD-ROM, and/or other type of rotating storage media, flash memory, EEPROM, or another type of solid state storage media) and may be generally operable to store instructions and data, and to permit access to stored instructions and data on demand. Likewise, network storage resource 170 may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data. In at least some embodiments, local storage resource 150 or network storage resources 170 may include a collection or array of storage devices and a storage controller. In some embodiments, information handling system 100 may have a redundant array of independent disks (RAID) installed thereon. For example, local storage resource 150 or network storage resource 170 may include a RAID system, in certain embodiments.

In information handling system 100, I/O subsystem 140 may comprise a system, device, or apparatus generally operable to receive and transmit data to or from or within information handling system 100. I/O subsystem 140 may represent, for example, a variety of communication interfaces, graphics interfaces, video interfaces, user input interfaces, and peripheral interfaces. In some embodiments, I/O subsystem 140 may comprise a touch panel and a display adapter (not shown). The touch panel may include circuitry for enabling touch functionality in conjunction with a display device that is driven by the display adapter.

In the illustrated embodiment, information handling system 100 also includes an FPGA 190, which may be programmed to provide services to software applications running on any of the virtual machines 105 by loading a bitstream file for each such service into a respective reconfigurable region of FPGA 190. The bitstream file, which may include a binary image or an object file that is consumed by the FPGA in order to program its gates, may be referred to herein as simply a "bitstream." In various embodiments, a bitstream loaded on FPGA 109 may implement an accelerator program or another type of specialized routine that is called by application software on one or more of the virtual machines 105.

In at least some embodiments, information handing system 100 may also include one or more power control modules and one or more power supply units (not shown).

In FIG. 1, hypervisor 104 may comprise software and/or firmware generally operable to allow multiple operating systems to run on a single information handling system at the same time. This operability is generally allowed via virtualization, a technique for hiding the physical characteristics of information handling system resources from the way in which other systems, applications, or end users interact with those resources. Hypervisor 104 may be one of a variety of proprietary and/or commercially available virtualization platforms, including, but not limited to, IBM's Z/VM, XEN, ORACLE VM, VMWARE's ESX SERVER, L4 MICROKERNEL, TRANGO, MICROSOFT's HYPER-V, SUN's LOGICAL DOMAINS, HITACHI's VIRTAGE, KVM, VMWARE SERVER, VMWARE WORKSTATION, VMWARE FUSION, QEMU, MICROSOFT's VIRTUAL PC and VIRTUAL SERVER, INNOTEK's VIRTUALBOX, and SWSOFT's PARALLELS WORKSTATION and PARALLELS DESKTOP. In one embodiment, hypervisor 104 may comprise a specially designed operating system (OS) with native virtualization capabilities. In another embodiment, hypervisor 104 may comprise a standard OS with an incorporated virtualization component for performing virtualization. In another embodiment, hypervisor 104 may comprise a standard OS running alongside a separate virtualization application. In this embodiment, the virtualization application of hypervisor 104 may be an application running above the OS and interacting with physical hardware 102 only through the OS. Alternatively, the virtualization application of hypervisor 104 may, on some levels, interact indirectly with physical hardware 102 via the OS, and, on other levels, interact directly with physical hardware 102 (e.g., similar to the way the OS interacts directly with physical hardware 102, and/or as firmware running on physical hardware 102), also referred to as device pass-through, such that the virtual machine may utilize a physical device directly without requiring the intermediate use of operating system drivers. As a further alternative, the virtualization application of hypervisor 104 may, on various levels, interact directly with physical hardware 102 (e.g., similar to the way the OS interacts directly with physical hardware 102, and/or as firmware running on physical hardware 102) without utilizing the OS, although still interacting with the OS to coordinate use of physical hardware 102.

As shown in FIG. 1, virtual machine 1 105-1 may represent a host for guest OS 108-1, virtual machine 2 105-2 may represent a host for guest OS 108-2 and virtual machine 3 105-3 may represent a host for guest OS 108-3. To allow multiple operating systems to be executed on system 100 at the same time, hypervisor 104 may virtualize certain hardware resources of physical hardware 102 and present virtualized computer hardware representations to each of virtual machines 105. In other words, hypervisor 104 may assign to each of virtual machines 105, for example, one or more processors from processor subsystem 120, one or more regions of memory in memory subsystem 130, one or more components of I/O subsystem 140, etc. The virtualized hardware representation presented to each of virtual machines 105 may comprise a mutually exclusive, or non-overlapping, set of hardware resources per virtual machine 105 (e.g., no hardware resources may be shared between virtual machines 105) or may comprise an overlapping set of hardware resources per virtual machine 105 (e.g., one or more hardware resources may be shared by two or more virtual machines 105).

In one embodiment, hypervisor 104 may assign hardware resources of physical hardware 102 statically (i.e., certain hardware resources are assigned to certain virtual machines, and this assignment does not vary over time). Additionally or alternatively, hypervisor 104 may assign hardware resources of physical hardware 102 dynamically (i.e., the assignment of hardware resources to virtual machines varies over time, for example, in accordance with the specific needs of the applications running on the individual virtual machines). Additionally or alternatively, hypervisor 104 may keep track of the hardware-resource-to-virtual-machine mapping, such that hypervisor 104 is able to determine the virtual machines to which a given hardware resource of physical hardware 102 has been assigned.

In FIG. 1, Each of virtual machines 105 may respectively include a guest operating system (guest OS) 108, along with any applications or other software (not shown) running on guest OS 108. Each guest OS 108 may represent an OS compatible with and/or supported by hypervisor 104 (even when guest OS is generally incompatible with physical hardware 102). In addition, each guest OS 108 may be a separate instance of the same operating system or an instance of three different operating systems. For example, in one embodiment, each guest OS 108 may comprise a LINUX OS. As another example, guest OS 108-1 may comprise a LINUX OS, guest OS 108-2 may comprise a MICROSOFT WINDOWS OS, and guest OS 108-3 may comprise a VXWORKS OS. Although system 100 is depicted as having three virtual machines 108-1, 108-2, and 108-3, it will be understood that, in particular embodiments, different numbers of virtual machines may be executing on information handling system 100 at any given time.

In operation of system 100 shown in FIG. 1, hypervisor 104 of information handling system 100 may virtualize the hardware resources of physical hardware 102 and present virtualized computer hardware representations to each of virtual machines 105. Each guest OS 108 of a virtual machine 105 may then begin to operate and run applications and/or other software (not shown). While operating, each guest OS 108 may utilize one or more hardware resources of physical hardware 102 assigned to the respective virtual machine by hypervisor 104.

In certain embodiments, a guest OS 108 or software application running on guest OS 108 on a virtual machine 105 may access services implemented on FPGA 190. In certain embodiments, FPGA 190 may be installed in hypervisor 104 as a virtual PCIe device. For example, information handling system 100 may include multiple processors connected to various devices, such as Peripheral Component Interconnect (PCI) devices and PCI express (PCIe) devices, including FPGA 190. The operating system (or BIOS) may include one or more drivers configured to facilitate the use of these devices.

FPGAs are typically not used in a virtualized environment nor are they typically shared between processes or virtual machines. In addition, until recently, FPGAs did not typically include reconfigurable regions (i.e., separately reconfigurable regions within a single FPGA). As FPGAs are increasingly made available in hosted cloud computing environments, their usage for virtual machine accelerators is also likely to increase. The systems and method disclosed herein may allow one or more FPGAs in a server to be used as a shared resource for virtual machines. For example, the techniques disclosed herein may be used to manage an FPGA card that is being used as a shared resource between virtual machines, various ones of which might or might not reside on the same physical computer hardware. More specifically, these techniques allow an FPGA service manager, such as FPGA service manager 220, to control or coordinate the programming, by users of virtual machines (e.g., guest operating systems, software applications, or other clients of the virtual machines) of reconfigurable regions of an FPGA with services that they need to perform their functions. The FPGA service manager may keep track of the concurrent users of the services implemented by the FPGA as users of the services drop in and out. The FPGA service manager may reclaim a region of the FPGA when it is no longer in use. In some embodiments, a single FPGA service manager may manage the programming and reclamation of reconfigurable regions on multiple FPGAs, keeping track of which services are loaded on each FPGA and the concurrent users of each of the services. In other embodiments, a system may include a respective FPGA service manager for each FPGA or FPGA card.

The techniques described herein may allow virtual machines to load or reconfigure respective regions of an FPGA themselves. In certain embodiments of the present disclosure, a virtual machine may provide a bitstream to the FPGA service manager for a service to be loaded into an FPGA for the use of a guest OS or software application running on the virtual machine. Alternatively, if a bitstream for a requested service is stored in a catalog maintained by the hypervisor, the FPGA service manager may obtain the bitstream from the catalog for loading into the FPGA. If a bitstream for a requested shared service has already been loaded into an FPGA, it may be accessed by one or more virtual machines other than the virtual machine at whose request the bitstream was loaded into the FPGA. In certain embodiment, a single virtual machine may access multiple services implemented by bitstreams loaded into an FPGA. This may include both a bitstream (or multiple bitstreams) provided by the same virtual machine (or a different virtual machine) and a bitstream (or multiple bitstreams) obtained from the catalog maintained by the hypervisor, in some embodiments.

Figure 2:
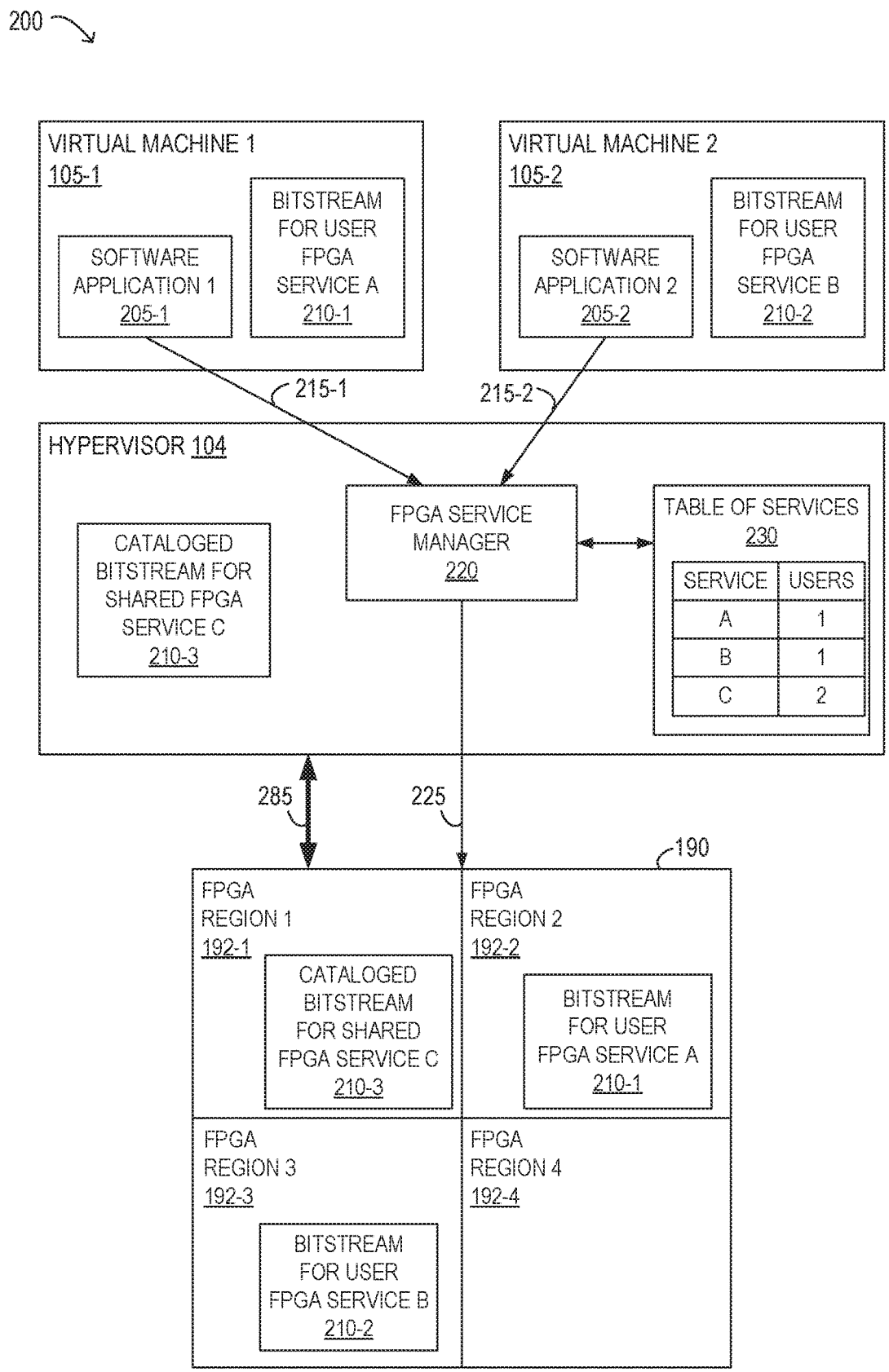
FIG. 2 is a block diagram illustrating, in more detail, selected elements of the information handling system depicted in FIG. 1.

Referring now to FIG. 2, selected elements 200 of an embodiment of the information handling system depicted in FIG. 1 are shown in more detail. It is noted that FIG. 2 is not drawn to scale but is a schematic illustration. As depicted in FIG. 2, operating on virtual machine 1 105-1 (e.g., on guest OS 108-1, not shown) is a software application 205-1, and operating on virtual machine 2 105-2 (e.g., on guest OS 108-2, not shown) may be a software application 205-2. Similarly, a software application 205-2 may operate on virtual machine 3 105-3 (e.g., on guest OS 108-3) (not shown in FIG. 2). While three virtual machines 105 are illustrated in FIG. 1 and two virtual machines 105 are illustrated in FIG. 2, an information handling system 100 may include any suitable number of virtual machines 105, in different embodiments. While each virtual machine 105 illustrated in FIG. 2 includes a single software application 205 running in a guest OS 108, the virtual machines 105 may include any suitable number of software applications 205, in different embodiments. As depicted in FIG. 2, virtual machine 1 105-1 maintains a bitstream for a user FPGA service A (shown as 210-1), and virtual machine 2 105-2 maintains a bitstream for a user FPGA service B (shown as 210-2). While each virtual machine 105 illustrated in FIG. 2 maintains a single bitstream 210, the virtual machines 105 may include any suitable number of bitstreams 210, in different embodiments.

As depicted in FIG. 2, hypervisor 104 includes an FPGA service manager 220 configured to manage the loading of multiple bitstreams, each implementing an FPGA service on behalf of one or more software applications executing in virtual machines in the system, into respective reconfigurable regions of the FPGA, and to reclaim regions of the FPGA when they are no longer needed. Hypervisor 104 maintains, in a catalog, a bitstream for a shared FPGA service C (shown as 210-3). In the depicted example, software application 205-1 sends a request 215-1 to FPGA service manager 220 for FPGA services A and C. In this example, bitstream 210-1 for FPGA service A is provided for loading into FPGA 190 by virtual machine 1 105-1, and bitstream 210-3 for FPGA service C is obtained for loading into FPGA 190 from the catalog maintained by hypervisor 104. In response to request 215-1, FPGA service manager 220 may load bitstream 210-3 into FPGA region 1 192-1 within FPGA 190, and may load bitstream 210-1 into FPGA region 2 192-2 within FPGA 190, for the benefit of software application 205-1.

In the depicted example, software application 205-2 sends a request 215-2 to FPGA service manager 220 for FPGA services B and C. In this example, bitstream 210-2 for FPGA service B is provided for loading into FPGA 190 by virtual machine 2 105-2. In this example, bitstream 210-3 has already been loaded into FPGA region 1 192-1. In response to request 215-1, FPGA service manager 220 may load bitstream 210-2 into FPGA region 3 192-3 within FPGA 190 for the benefit of software application 205-2. Thereafter, software application 205-2 may use both FPGA service B and FPGA service C, as implemented on FPGA 190.

As depicted in FIG. 2, FPGA service manager 220 may maintain a table of services 230 in which it records information about each bitstream instance that is loaded on FPGA 190, including the number of users that are concurrently using the service implemented by the bitstream instance at a given point in time. In certain embodiments, the table of services 230 may reside in memory on information handling system 100. For example, the table of services 230 may reside in memory that is local to, or accessible by, the hypervisor and the FPGA service manager thereof. As described herein, the table of services 230 may be used by the FPGA service manager to keep track of the bitstreams that are loaded in the FPGA and the number of concurrent users for each bitstream. For example, at the point in time illustrated in FIG. 2, FPGA service A has a single user (software application 205-1), FPGA service B has a single user (software application 205-2), and FPGA service C has two users (software applications 205-1 and 205-2). In some embodiments, each entry within table of services 230 may include an identifier of the specific bitstream instance that is loaded on the FPGA for a given service. In some embodiments, each entry within table of services 230 may include identifiers of each user of a given bitstream instance, e.g., identifiers of the virtual machines or the specific applications that use the service provided by a given bitstream instance loaded on the FPGA. It should be noted that FPGA service manager 220, the catalog containing the cataloged bitstream 210-3, and the table of services 230 may be disaggregated from the hypervisor, running either as a driver or inside a virtual machine, in alternate embodiments.

As noted above, FPGA 190 may be installed in hypervisor 104 as a virtual PCIe device, in some embodiments. In such embodiments, hypervisor 104 may communicate with FPGA 190 over a PCIe interface (shown as PCIe interface 285). In some embodiments, FPGA service manager 220 may control the loading of bitstreams into various regions 192 of FPGA 190 and the reclamation of various regions 192 of FPGA 190 using commands or control signals sent from FPGA service manager 220 to FPGA 190 (shown as 225). These commands or control signals may be implemented in different ways, in different embodiments. For example, in certain embodiments, the system may provide a software interface between virtual machines 105, guest operating systems 108, or software applications 205 and FPGA service manager 220, or between FPGA service manager 220 and FPGA 190. In some embodiments, commands for programming or reclaiming a region 192 of FPGA 190 may be sent in accordance with an application programming interface (API) provided in a library. In still other embodiments, commands for programming or reclaiming a region 192 of FPGA 190 may be provided through a virtual function. Other mechanisms for programming or reclaiming a region 192 of FPGA 190 are possible, in certain embodiments. In some embodiments, in response to a command or control signal 225 indicating that a bitstream is to be loaded into a particular region of FPGA 190, the bitstream may be provided to FPGA 190 over PCIe interface 285. For example, many FPGA vendors provide mechanisms to allow programming of an FPGA over a PCIe bus. In some embodiments, any communication between a software application 205 and an FPGA service 210 implemented on FPGA 190 may be made over PCIe interface 285.

Figure 3:
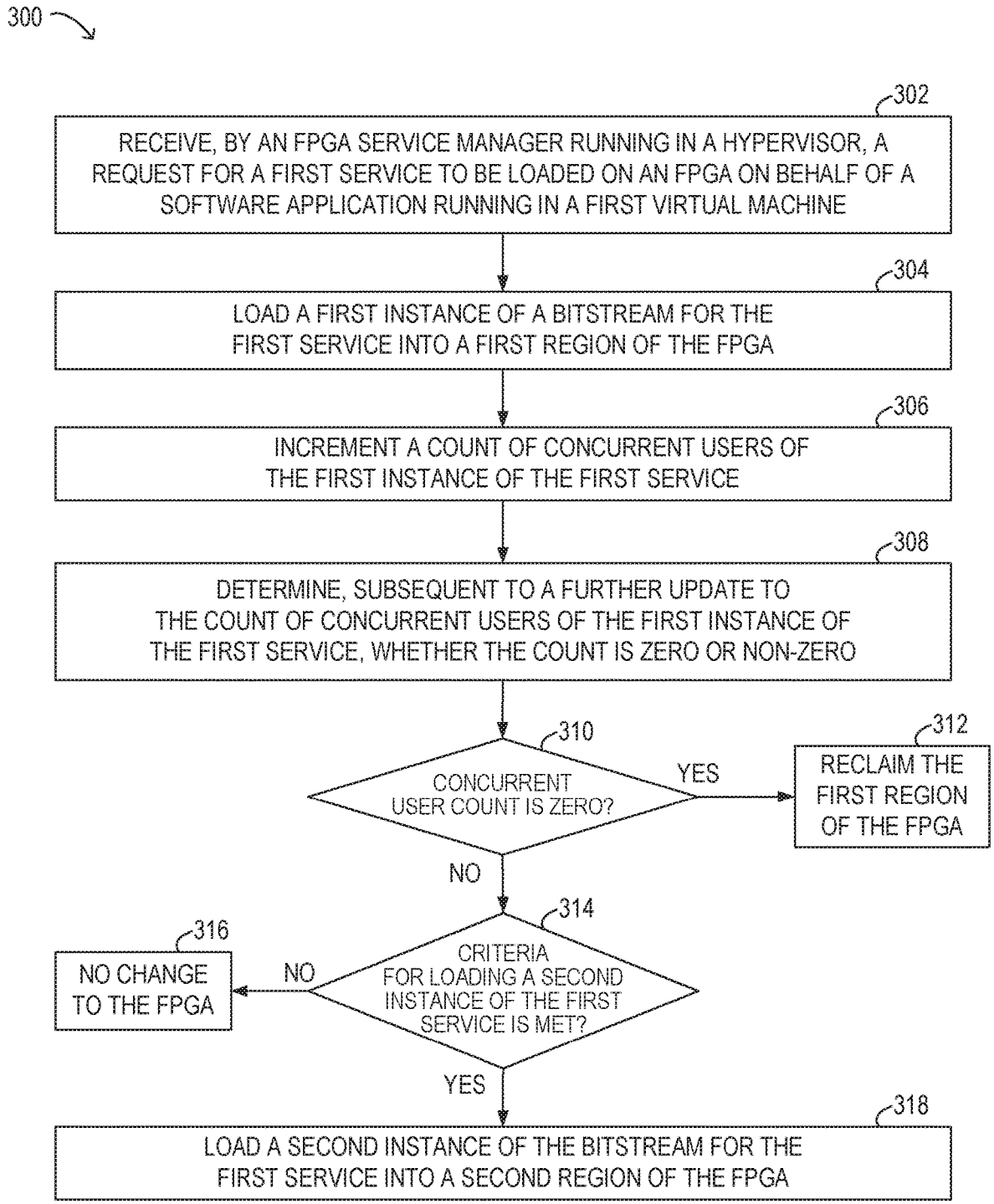
FIG. 3 is a flow diagram illustrating selected elements of an embodiment of a method for managing shared services in reconfigurable regions of an FPGA.

Referring now to FIG. 3, selected elements of an embodiment of a method 300 for managing shared services in reconfigurable FPGA regions, as described herein, are depicted in flow diagram form. Method 300 may be performed using information handling system 100 (see FIGS. 1 and 2). It is noted that certain operations described in method 300 may be optional or may be rearranged in different embodiments. Method 300 may begin, at step 302, with an FPGA service manager running in a hypervisor receiving a request for a first service to be loaded on an FPGA on behalf of a software application running in a first virtual machine. Method 300 may include, at 304, loading a first instance of a bitstream for the first service into a first region of the FPGA. As described in more detail herein, in some cases, the bitstream may be received from the first virtual machine. In other cases, the bitstream may be obtained from a catalog of bitstreams that is maintained by the hypervisor.

In the example embodiment illustrated in FIG. 3, method 300 may include, at 306 incrementing a count of concurrent users of the first instance of the first service. For example, the FPGA service manager may maintain, for each bitstream instance loaded in a respective region of the FPGA on behalf of one or more software applications running in a virtual machines, a respective count of concurrent users of the bitstream instance.

Method 300 may include, at 308, determining, subsequent to a further update to the count of concurrent users of the first instance of the first service, whether the count is zero or non-zero. For example, the FPGA service manager may determine when and whether to reclaim a reconfigurable region of the FPGA, dynamically, using a counter whose value reflects the number of concurrent users of a service implemented by a bitstream loaded into the reconfigurable region of the FPGA. The value of the counter may be incremented each time a user (e.g., a guest OS or software application running in a virtual machine) requests the use of the service, and may be decremented each time a software application that accesses the service terminates or each time a virtual machine on which such software application is running is migrated to different physical hardware resources. The counter value may go to zero if and when the last such virtual machine is migrated or the last such software application is terminated. If, at 310, it is determined that the count of concurrent users of the first instance of the first service is zero, method 300 may include reclaiming the first region of the FPGA, as in 312. If the first region of the FPGA is reclaimed, it may be subsequently be repurposed by the FPGA service manager. For example, subsequent to reclaiming the first region of the FPGA, the FPGA service manager may load an instance of a bitstream for a different service into the reclaimed region of the FPGA. In another example, subsequent to reclaiming the first region of the FPGA, the FPGA service manager may load an instance of a different bitstream version for the first service into the reclaimed region of the FPGA. If, at 310, it is determined that the count of concurrent users of the first instance of the first service is non-zero, method 300 may include, at 314, determining whether criteria for loading a second instance of the first service is met. Examples of such criteria are described in more detail below. If criteria for loading a second instance of the first service is met, the method may include loading a second instance of the bitstream for the first service into a second region of the FPGA, as in 318. Otherwise, there may be no change to the FPGA, as in 316.

In at least some embodiments of the present disclosure, a header format has been defined for information to be maintained in a catalog of FPGA services by the hypervisor. In certain embodiments, this header information may be added to existing bitstream formats for programming FPGAs. In some embodiments, multiple device-compatible bitstreams may be stored in the catalog for a single service.

One embodiment of an FPGA service catalog 400 is illustrated in FIG. 4. In some embodiments FPGA service catalog 400 may reside in non-volatile storage on disk within information handling system 100 (e.g., within local storage resource 150 or network storage resources 170). In the example embodiment illustrated in FIG. 4, service catalog 400 includes, for each service represented in the catalog, a service name (shown as 410), an indicator of a revision of the service (shown as 412), and one or more bits that represent an indication of backward compatibility for the cataloged revision of the service (shown as 414). The service name may, in some cases, indicate the functionality of the service, such as "Zlib compressor" or "IPSEC". In some embodiments, these three elements may be the only required elements in a catalog listing header for a given service. In the example embodiment illustrated in FIG. 4, the catalog also includes, for each service represented in the catalog, one or more execution constraints for the service, such as data representing a concurrent count maximum (shown as 416), a queue high threshold value (shown as 418), and a maximum bandwidth value (shown as 420). The value of concurrent count maximum 420 may indicate the maximum number of concurrent users that can be supported by a single instance of the bitstream. For example, the bitstream itself might only define a certain number of pipelines and, if oversubscribed, may run out of partially reconfigurable space or be otherwise unable to handle a large number of concurrent users. For some services, although a computation performed by the service may be pipelined in hardware to support multiple concurrent users, there may be one or more fixed-depth queues used by the service. Therefore, the number of concurrent users that a single instance of a bitstream for the given service may be finite, and exceeding that number may have an adverse effect on performance. The value of queue high threshold 418 may represent a maximum depth for one such queue that is internal to a service. In another example, a service may employ a queue pertaining to incoming network packets. This constraint may affect the number of users that a single instance of the bitstream can support at one time. Similarly, the value of maximum bandwidth value 420 may represent a bandwidth constraint for the service, which may limit the number of users that a single instance of the bitstream can support at one time.

As depicted in FIG. 4, catalog 400 may include any number of bitstreams for a given service, shown as binary images 430. Each bitstream, or binary image, includes header information, including bitstream-specific execution constraints, such as a respective tag indicating the FPGA or CPU class with which the particular bitstream is compatible (shown as 432), and respective performance or capability information for the particular bitstream (shown as 433). By storing multiple bitstream versions for a given service, the systems described herein may be able to accommodate the use of different types of physical FPGA devices when providing FPGA services for the use of virtual machines and the software applications that run on them. In other embodiments, more, fewer, or different elements may be included in catalog 400.

In certain embodiments, the FPGA service manager may decide when and whether to duplicate an instance of a bitstream that implements a given FPGA service for optimum performance, based on the execution constraints for the given service or for the specific version of the bitstream instance. For example, the FPGA service manager may selectively duplicate an instance of a bitstream that implements a given FPGA service based, at least in part, on the actual number of concurrent users at a given point in time, the concurrent count maximum 420, the queue high threshold value 418, the maximum bandwidth value 420, or a current bandwidth allocation. In certain embodiments, back pressure on a bitstream instance may be detected based on a queue threshold, which is filled and determined by the volume of tasks coming from the users. In other embodiments, the FPGA service manager may duplicate a bitstream instance based on a requested bandwidth and the maximum bandwidth capacity of the service, according to the execution constraint information contained in the bitstream header. If and when criteria for loading one or more additional copies of the bitstream are met, the FPGA service manager may load one or more additional instances of the bitstream into respective regions of the FPGA.

In certain embodiments, the FPGA service manager may accept FPGA service preloading requests. For example, if a genomics application is using bitstreams for services A and B in an alternating fashion, the application may request, and the FPGA service manager may perform, a preload of the bitstream for service B while the bitstream for A is in use and vice versa.

Figure 5:
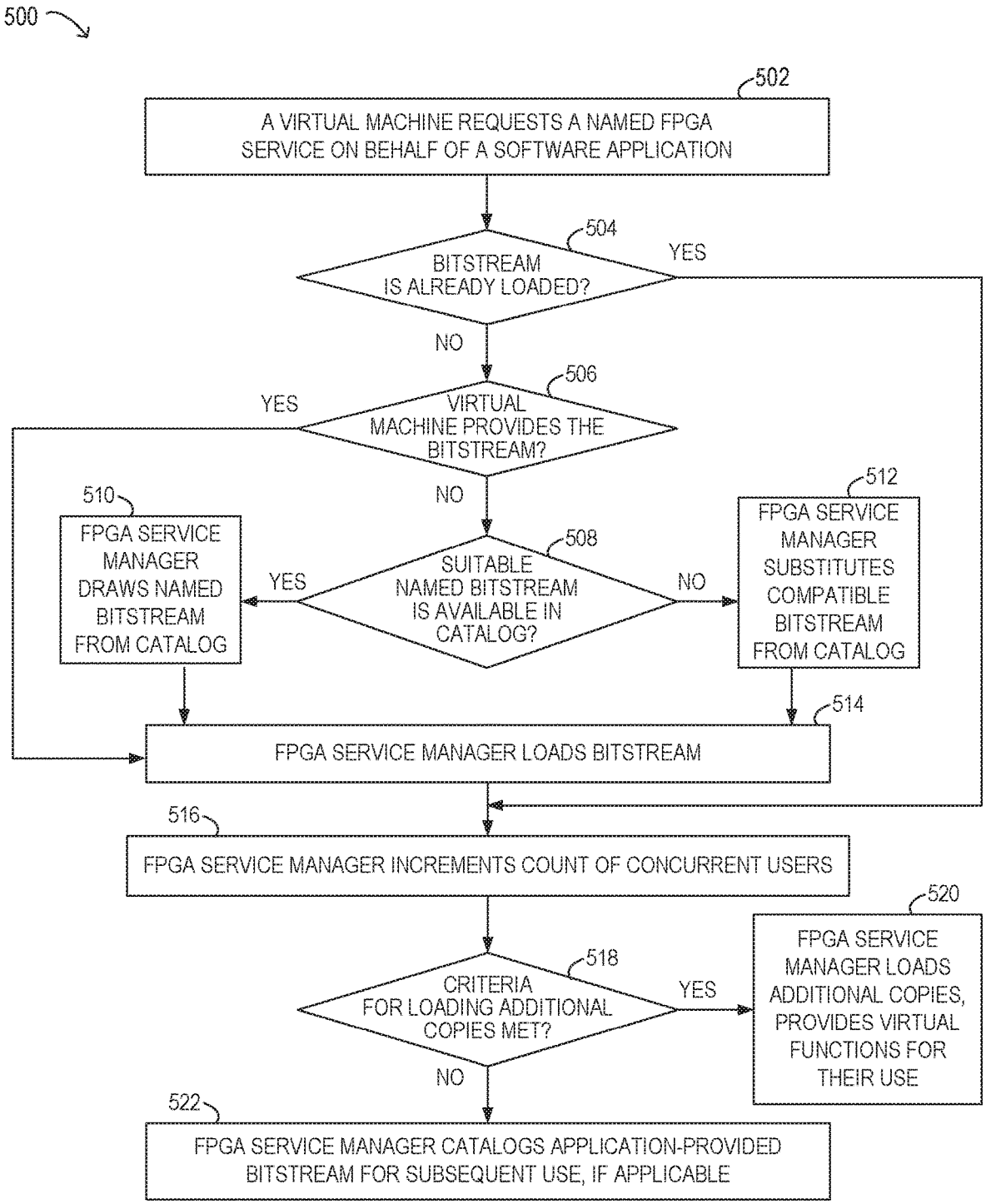
FIG. 5 is a flow diagram illustrating selected elements of an embodiment of a method for responding to a request for an FPGA service.

Referring now to FIG. 5, selected elements of an embodiment of method 500 for responding to a request for an FPGA service, as described herein, are depicted in flow diagram form. Method 500 may be performed using information handling system 100 (see FIGS. 1 and 2). It is noted that certain operations described in method 500 may be optional or may be rearranged in different embodiments.

In the example embodiment illustrated in FIG. 5, method 500 may begin, at 502, with a virtual machine requesting a named FPGA service on behalf of a software application running in the virtual machine. For example, the virtual machine may request service from a named accelerator to be provided by a bitstream loaded into an FPGA for the benefit of the software application. If, at 504, it is determined that the requested bitstream is already loaded on the FPGA, the method may proceed to 516. Otherwise, if it is determined that the requested bitstream is not already loaded on the FPGA, the method may include obtaining the bitstream for loading. If, at 506, the virtual machine provides the bitstream for loading, method 500 may proceed to 514. Otherwise, method 500 may proceed to 508. If, at 508, a suitable version of the named bitstream is available in the catalog maintained by the hypervisor, the FPGA service manager may draw the named bitstream from the catalog for loading, as in 510. For example, if a bitstream instance for the service having a tag 432 that indicates its compatibility with the FPGA into which it is to be loaded and having suitable performance capability characteristics (as indicated by header information 433) is available in the catalog, it may be loaded into the FPGA. Alternatively, the FPGA service manager may substitute a bitstream other than the named bitstream that is compatible with the FPGA and the software application on whose behalf the FPGA service was requested, as in 512. For example, in some embodiments, the FPGA service manager may be configured to substitute a bitstream other than the named bitstream if there is not an appropriate device-compatible bitstream instance for the named service in the catalog, but the catalog contains a suitable alternative. For example, the FPGA service manager may load an instance of a bitstream for an alternate service with a different name if it determines that the bitstream for the alternate service provides equivalent functionality. In some embodiments, the FPGA service manager may maintain or access an equivalence table that maps certain named services with alternately named services that provide equivalent functionality and are compatible with the target FPGA. For example, the catalog may include multiple bitstreams and bitstream versions for certain industry standard functions or commonly used mathematical algorithms, and the FPGA service manager may select an appropriate one of the bitstreams for loading into an FPGA in the system in response to a request for a particular named service based on the mappings in an equivalence table. Note that the response to an error condition in which no suitable bitstream for a requested service is available is not shown in FIG. 5. In this case, the interface between the FPGA service manager and the caller may be configured to provide an indication of this condition, after which the application software may make a decision to proceed with a software (non-accelerated) version of the requested service.

Method 500 may include, at 514, the FPGA service manager loading the bitstream and, at 516, the FPGA service manager incrementing a count of concurrent users of the bitstream. For example, the FPGA service manager may update an entry for the bitstream instance in a table, such as table 230 illustrated in FIG. 2. Method 500 may include, subsequent to incrementing of the count of concurrent users, determining whether criteria for loading one or more additional copies of the bitstream are met, as in 518. If so, method 500 may include, at 520, the FPGA service manager loading one or more additional copies of the bitstream into respective regions of the FPGA and providing virtual functions for their use. In some embodiments, method 500 may also include the FPGA service manager cataloging the application-provided bitstream for subsequent use, if applicable, as in 522. In one example, in reference to in the system illustrated in FIG. 2, FPGA service manager 220 may pro-actively store a copy of bitstream 210-1, which was provided by virtual machine 1 105-1 for loading into FPGA 190, or a copy of bitstream 210-2, which was provided by virtual machine 2 105-2 for loading into FPGA 190, in an FPGA service catalog maintained by the hypervisor for subsequent use by these or other virtual machines 105. In some embodiments, FPGA service manager 220 may not be authorized to catalog certain bitstreams 210 that are provided by one of the virtual machines 105, because these bitstreams are not intended to be shared with other virtual machines 105. In other embodiments, FPGA service manager 220 may not be authorized to catalog any bitstreams 210 that are provided by one of the virtual machines 105 without receiving explicit authorization to do so.

Figure 6:
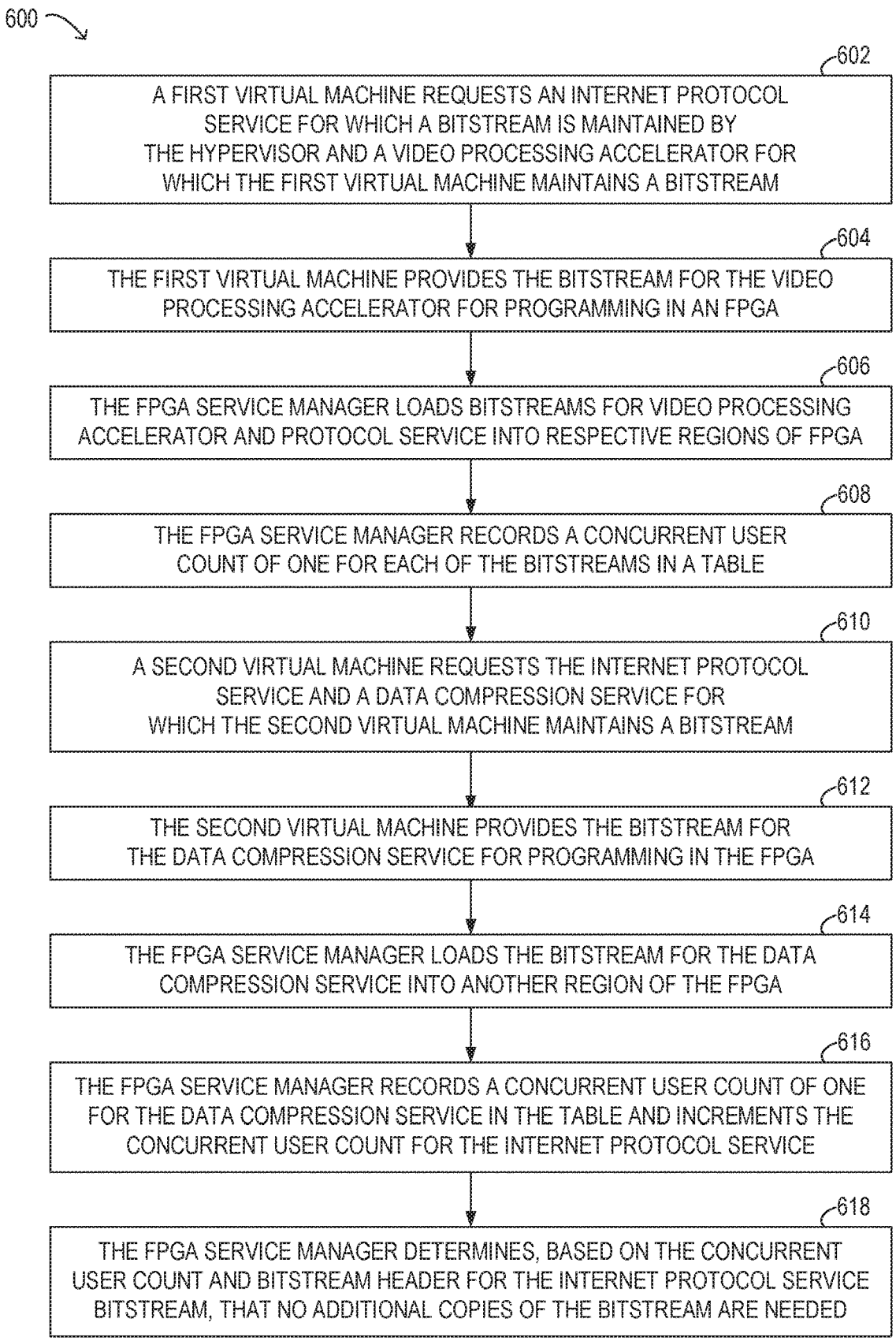
FIG. 6 is a flow diagram illustrating selected elements of an embodiment of a method for managing FPGA services requested by multiple virtual machines in an example system.

Referring now to FIG. 6, selected elements of an embodiment of a method 600 for managing FPGA services requested by multiple virtual machines in an example system, as described herein, are depicted in flow diagram form. Method 600 may be performed using information handling system 100 (see FIGS. 1 and 2). In this example, the system includes a combination of accelerators, some of which are provided by the hypervisor and some of which are provided by the requesting virtual machines. In this example, it may be assumed that physical interfaces for PCIe, which are needed for device enumeration, are maintained by the BIOS. In this example, a first virtual machine has a video processing accelerator (e.g., an image filtering accelerator) that it uses in a content delivery network. A second virtual machine has a content catalog manager that includes its own data compression service. Both virtual machines use an internet protocol service in accordance with the Internet Protocol Security (IPSEC) network protocol suite. This service is used to authenticate and encrypt data packets that are exchanged over a network. It is noted that certain operations described in method 600 may be optional or may be rearranged in different embodiments.

As illustrated in FIG. 6, method 600 may begin, at 602, with a first virtual machine requesting the internet protocol service for which a bitstream is maintained by the hypervisor and the video processing accelerator for which the first virtual machine maintains a bitstream. The method may include, at 604, the first virtual machine providing the bitstream for the video processing accelerator for programming in an FPGA. Method 600 may also include, at 606, the FPGA service manager loading the bitstreams for the video processing accelerator and for the internet protocol service into respective regions of the FPGA. At 608, the method may include the FPGA service manager recording a concurrent user count of one for each of these bitstreams in a table, such as table 230 illustrated in FIG. 2.

Method 600 may include, at 610, a second virtual machine requesting the internet protocol service and the data compression service for which the second virtual machine maintains a bitstream. The method may include, at 612, the second virtual machine providing the bitstream for the data compression service for programming in the FPGA. At 614, the method may include the FPGA service manager loading the bitstream for the data compression service into another region of the FPGA, i.e., a region of the FPGA other than the regions in which the bitstreams for the video processing accelerator and for the internet protocol service were loaded.

Method 600 may also include, at 616, the FPGA service manager recording a concurrent user count of one for the data compression service in the table and incrementing the concurrent user count for the protocol service to two. The method may also include, at 618, the FPGA service manager determining, based on the concurrent user count and a bitstream header for the internet protocol service bitstream, that no additional copies of the bitstream are needed. For example, the FPGA service manager may determine that the internet protocol service can handle two concurrent users with its pipeline design without incurring a performance penalty and may choose not to load a duplicate copy of the bitstream for the internet protocol bitstream in the FPGA.

As FPGA usage increases, it may be challenging to balance the use of these finite hardware resource, with a multitude of services, between multiple applications distributed amongst multiple environments, which may include virtual machine environments. The services used within any particular FPGA, and the applications under load on a server, may vary over time. In some cases, the motivation for using FPGAs to provide services may be based on a need for greater performance, or to offload one or more hardware processors. In these cases, latency and throughput may be important, and the use of "slow" software (such as a driver, an operating system, or a hypervisor) to manage a task flow for one or more FPGAs may be counter to system performance goals. In some existing systems, and with other classes of accelerators, the effort required to dispatch a task to an accelerator and then to receive an answer from the accelerator may negate any speed-up or other benefit provided by offloading the task to the accelerator. In certain embodiments of the present disclosure, the techniques described herein for coordinating FPGA services using cascaded FPGA service managers may be applied within servers to provide FPGA services to applications in a performant manner, while preserving the flexibility and capabilities provided by virtualization and by operating-system-invoked or container-invoked isolation.

In at least some embodiments, the systems described herein may allow services running on FPGAs to be freely available for the use of software applications running on host systems regardless of whether the software applications are executing in a native operating system, are executing within containers, or are executing within virtual machines. The software applications may reference the FPGA services using abstract, logical names, rather than referencing them based on their physical locations on particular FPGAs. As described above, a software application may, in some embodiments, supply a binary image or bitstream for a service to be loaded into an FPGA and used by the software application.

In certain embodiments, the use of one or more FPGA service managers, each of which may be implemented as an agent at the operating system level, at the hypervisor level, or at an FPGA appliance level, may abstract the FPGA from the software application level. For example, an application may request a specific named service (or may supply a binary image or bitstream for a service itself) and an agent (or agents) at the higher levels may transparently provide the service to the application. Alternatively, an FPGA service manager may orchestrate the execution of the requested service using an alternative to an FPGA implementation, such as by providing a software version of the requested service to be executed by a traditional processor or processor subsystem.

As described above, binary images or bitstreams for FPGA services may be dynamically loaded into and unloaded from reconfigurable regions of one or more FPGAs by an FPGA service manager. In certain embodiments, an FPGA service manager may load bitstreams into and unload bitstreams from the FPGAs based on demand, be it implicit or explicit. The loading and unloading of the bitstreams may be transparent to the software applications that use the FPGA services. As described above, in certain embodiments, and under certain circumstances, an FPGA service manager may load an alternative bitstream for a requested service as long as it provides the same functionality as the requested service and is compatible with the FPGA into which it is loaded. In certain embodiments, a system may include and support the use of different classes of incompatible FPGAs. In such embodiments, a library of services may include, for at least some services, multiple binary images, including one for each incompatible class of FPGAs or CPUs.

In at least some embodiments of the present disclosure, FPGA service management may be coordinated between cascaded FPGA service managers that are hosted at different levels of the stack, such as at an FPGA appliance level, a hypervisor level, or an operating system level. Applications may be free to migrate (e.g., using virtual machine migration) from one physical machine to another physical machine without a directly observable effect on service availability. In some embodiments, multiple applications may use the same FPGA service unbeknownst to each other. As described above, an FPGA service may be replicated multiple times and utilized by one or more applications. In some embodiments, FPGAs that provide services may not be bound to the same host or root-complex. FPGAs, and the services they provide, may be shared amongst multiple hosts.

As described herein, each FPGA service manager may maintain a library of binary images for FPGA services in order to unencumber applications from the responsibility to maintain the binary images for the FPGA services they use themselves. In certain embodiments, applications may directly access FPGA hardware in order to obtain the lowest possible latency and highest possible throughput. However, the FPGA service managers may maintain the ability to intercept services to effect the relocating of the services or the migration of the virtual machines on which software applications that use the services are running.

As described in more detail below, an information handling system may include multiple layers at which FPGAs can be placed (e.g., internal to a server, in a few-to-one expansion box, in an FPGA appliance at the rack or at the data-center level, or in an FPGA appliance within the cloud), and may include different software layers within which applications can run (e.g., within a native operating system, within a hypervisor, within a container, or within a virtual machine). As noted above, these systems may support the migration of applications, especially in the context of virtual machine migration. In at least some embodiments, the systems described herein may employ cascaded FPGA service managers that are instantiated at two or more of these different software layers. Each of these FPGA service managers may implement the same subsystems such that, regardless of the layer on which a given FPGA service manager is instantiated, there may be a common set of interactions from one level to the next. This may allow an application to obtain access to a requested FPGA service without any direct knowledge about whether the service is implemented within a container, whether the service is implemented within a virtualized environment, or whether the FPGA on which the service is implemented is local to or remote from the server on which the requesting application is running.

Figure 7:
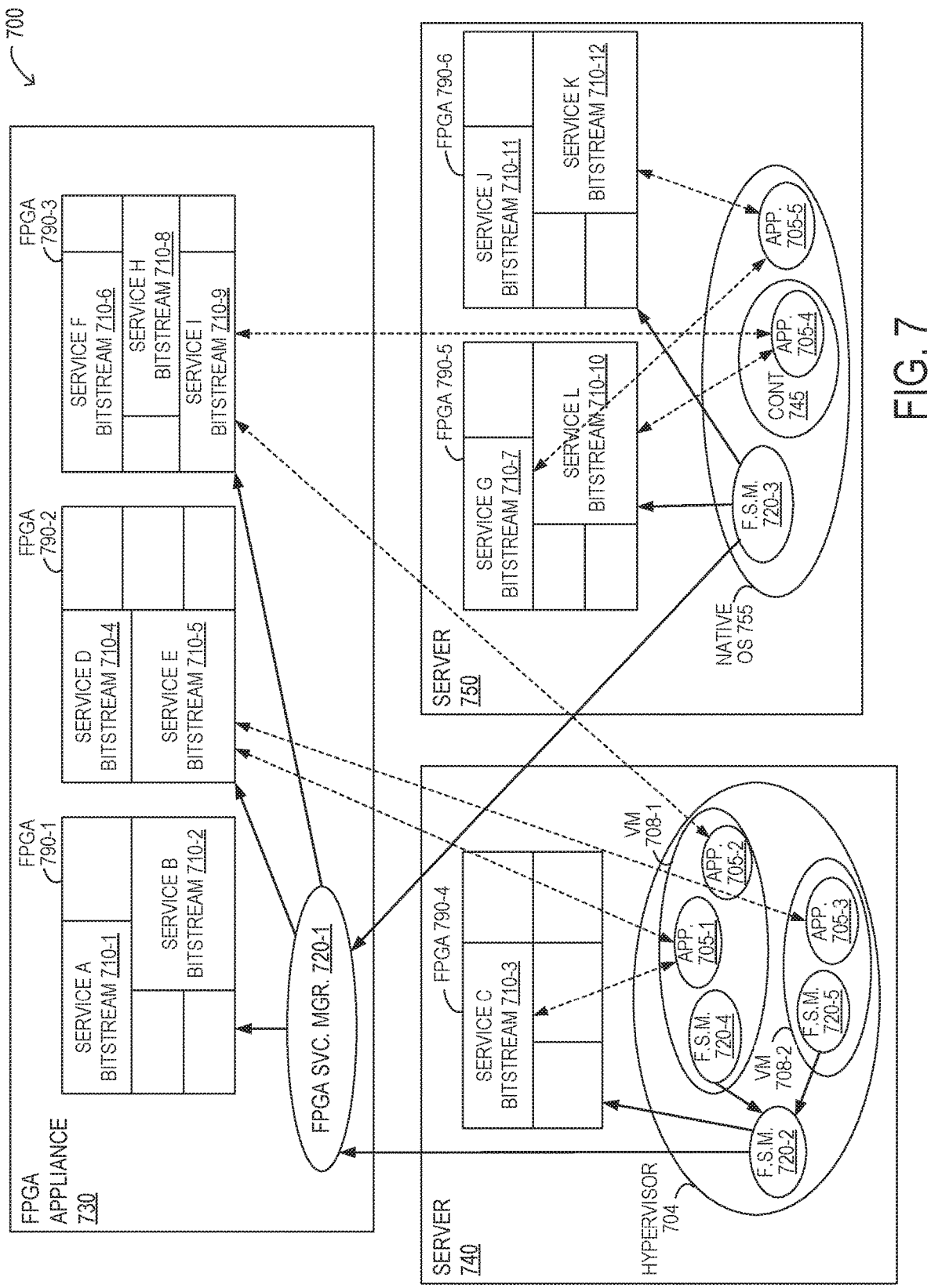
FIG. 7 is a block diagram illustrating selected elements of an embodiment of system including an FPGA appliance and multiple servers, each of which includes at least one FPGA service manager.

FIG. 7 is a block diagram illustrating selected elements of an embodiment of system 700 including an FPGA appliance and multiple servers, each of which includes at least one FPGA service manager. In this example embodiment, system 700 includes an FPGA appliance 730, which includes three FPGAs 790 and an FPGA service manager 720-1. In some embodiments, the system may adhere to one of several emerging standards for allowing multiple servers to connect to one or more FPGA appliances through an input/output (IO) fabric. For example, FPGA appliance 730 may be implemented as a device (e.g., a box) that includes multiple FPGAs and, through this type of IO fabric, these FPGAs may communicate with applications executing on multiple servers. In certain embodiments, FPGA service manager 720-1 may be similar to FPGA service manager 220 illustrated in FIG. 2.

In the illustrated embodiment, two or more bitstreams for FPGA services are loaded into respective regions of each FPGA 790. For example, a bitstream 710-1 for an FPGA service A and a bitstream 710-2 for an FPGA service B are loaded into respective regions of FPGA 790-1. Similarly, a bitstream 710-4 for an FPGA service D and a bitstream 710-5 for an FPGA service E are loaded into respective regions of FPGA 790-2. In this example embodiment, a bitstream 710-6 for an FPGA service F, a bitstream 710-8 for an FPGA service H and a bitstream 710-9 for an FPGA service I are loaded into respective regions of FPGA 790-3.

Also included in system 700 are server 740 and server 750. Server 740 includes a hypervisor 704, which may be the same as or similar to hypervisor 104 illustrated in FIG. 1 and FIG. 2. Executing within hypervisor 704 are FPGA service manager 720-2 and two guest operating systems 708, each of which includes a local FPGA service manager 720 and one or more software applications 705. FPGA service manager 720-2, which operates at the level of hypervisor 704, may include a device manager for interacting with FPGA 790-4 to provide FPGA service C, for which a bitstream 710-3 is loaded into FPGA 790-4, to software applications 705 running in either of the guest operating systems 708 within hypervisor 704. For example, software applications 705-1 and 705-2 may send requests for services to their local FPGA service manager 720-4, and FPGA service manager 720-4 may pass those requests to FPGA service manager 720-2, which operates at the level of hypervisor 704. Similarly, software application 705-3 may send requests for services to its local FPGA service manager 720-5, and FPGA service manager 720-5 may pass those requests to FPGA service manager 720-2, which operates at the level of hypervisor 704. In certain embodiments, FPGA service manager 720-2 may also interact with FPGA service manager 720-1, which operates at a level above hypervisor 704, to provide services A, B, D, E, F, H, or I, for which respective bitstreams have been loaded into FPGAs 790-1, 790-2, and 790-3, to software applications 705 running in either of the guest operating systems 708 within hypervisor 704. Communication between FPGA service managers may be implemented using any of a variety of standard or custom communication techniques, in different embodiments. In one example, a device driver may be exposed between a virtual machine and a hypervisor such that an FPGA service manager instantiated within a guest operating system can treat an FPGA service manager operating at the hypervisor level as a device. In another example, an FPGA service manager instantiated within a guest operating system may communicate with another FPGA service manager (e.g., an FPGA service manager operating at the hypervisor level) through a shared memory authorized by the hypervisor. Communication between FPGA service managers instantiated on one server or box and FPGA service managers instantiated on a different server box may be implemented using any of a variety of standard or custom communication techniques. For example, in various embodiments, the communication interface between such service managers may include, but is not limited to, an interface implemented in accordance with a custom or standard message passing interface (e.g., MPI), an interface in accordance with a custom or standard procedure call protocol (e.g., the remote procedure call, or RPC, protocol), an interface that employs remote direct memory access (RDMA), an interface based on TCP connections between TCP sockets on multiple endpoint devices or instances.

In the illustrated embodiment, server 750 includes a native operating system 755. Executing within the native operating system 755 are FPGA service manager 720-3, a container 745 in which a software application 705-4 is executing, and a software application 705-5. FPGA service manager 720-3, which operates at the level of native operating system 755, may include a device manager for interacting with FPGA 790-5 and FPGA 790-6 to provide FPGA services G, L, J, and K, for which respective bitstreams have been loaded into FPGAs 790-5 and 790-6, to software applications 705 running within native operating system 755. For example, software application 705-4 running within container 745 and software application 705-5 may send requests for services to their local FPGA service manager 720-3, which operates at the level of native operating system 755. In certain embodiments, FPGA service manager 720-3 may also interact with FPGA service manager 720-1, which operates at a level above hypervisor 704, to provide services A, B, D, E, F, H, or I, for which bitstreams have been loaded into FPGAs 790-1, 790-2, and 790-3, to software applications 705 running within native operating system 755.

In FIG. 7, some of the solid arrows indicate communications between pairs of cascaded FPGA service managers 720, specifically from an FPGA service manager 720 at a lower level to an FPGA service manager 720 at a higher level. Other ones of the solid arrows indicate interactions between the FPGA service managers 720 and various FPGAs 790. In FIG. 7, the dashed lines indicate the use of various FPGA services by software applications 705 at a given point in time. For example, dashed arrows indicate that software application 705-1 executing within guest OS 708-1 uses service C, for which a bitstream 710-3 is loaded into FPGA 790-4 on server 740, and service E, for which a bitstream 710-5 is loaded into FPGA 790-2 of FPGA appliance 730. A dashed arrow indicates that software application 705-2 executing within guest OS 708-1 uses service I, for which a bitstream 710-9 is loaded into FPGA 790-4 of FPGA appliance 730. A dashed arrow indicates that software application 705-3 executing within guest OS 708-2 uses service E, for which a bitstream 710-5 is loaded into FPGA 790-2 of FPGA appliance 730. In addition, dashed arrows indicate that software application 705-4 executing within container 745 uses service L, for which a bitstream 710-10 is loaded into FPGA 790-5 on server 750, and service I, for which a bitstream 710-8 is loaded into FPGA 790-3 of FPGA appliance 730. Finally, dashed arrows indicate that software application 705-5 executing within native operating system 755 uses service G, for which a bitstream 710-7 is loaded into FPGA 790-5 on server 750, and service K, for which a bitstream 710-12 is loaded into FPGA 790-6 on server 750. Note that while system 700 illustrated in FIG. 7 includes a specific number of FPGAs, FPGA services, software applications, and FPGA service managers in particular combinations on different software layers, in other embodiments of the present disclosure a system that uses cascaded FPGA managers to coordinate FPGA service may include any suitable number and combination of these elements. In addition, as described above some of the FPGA services provided in an information handling system may be duplicated, with respective instances of the bitstreams for these services being loaded into multiple FPGAs of FPGA appliance 730, server 740, and server 750.

In certain embodiments, each of the FPGA service managers may use capabilities that are proxied through the chain of cascaded FPGA service managers and fulfilled at different levels. For example, some FPGA service managers may provide a requested FPGA service by directly interfacing with FPGA hardware, if it is at the same level or if it is installed in the same enclosure. Other FPGA service managers may provide a requested FPGA service by cascading up through a series of FPGA service managers to obtain the requested FPGA service from FPGA hardware at a different level. For example, the FPGA hardware may reside on a disaggregated piece of equipment, such as an FPGA appliance. In this manner, a virtual hierarchy may be built. In certain embodiments, communication between the different layers (e.g., the operating system layer, the container layer, the hypervisor layer, and the FPGA appliance layer) for the purpose of coordinating FPGA services to applications may include communication to effect the discovery of available FPGA hardware, the discovery, distribution, and use of binary images within distributed libraries, the reservation of FPGA resources, or the gathering of performance data related to the FPGA services, such as throughput and latency.

Figure 8:
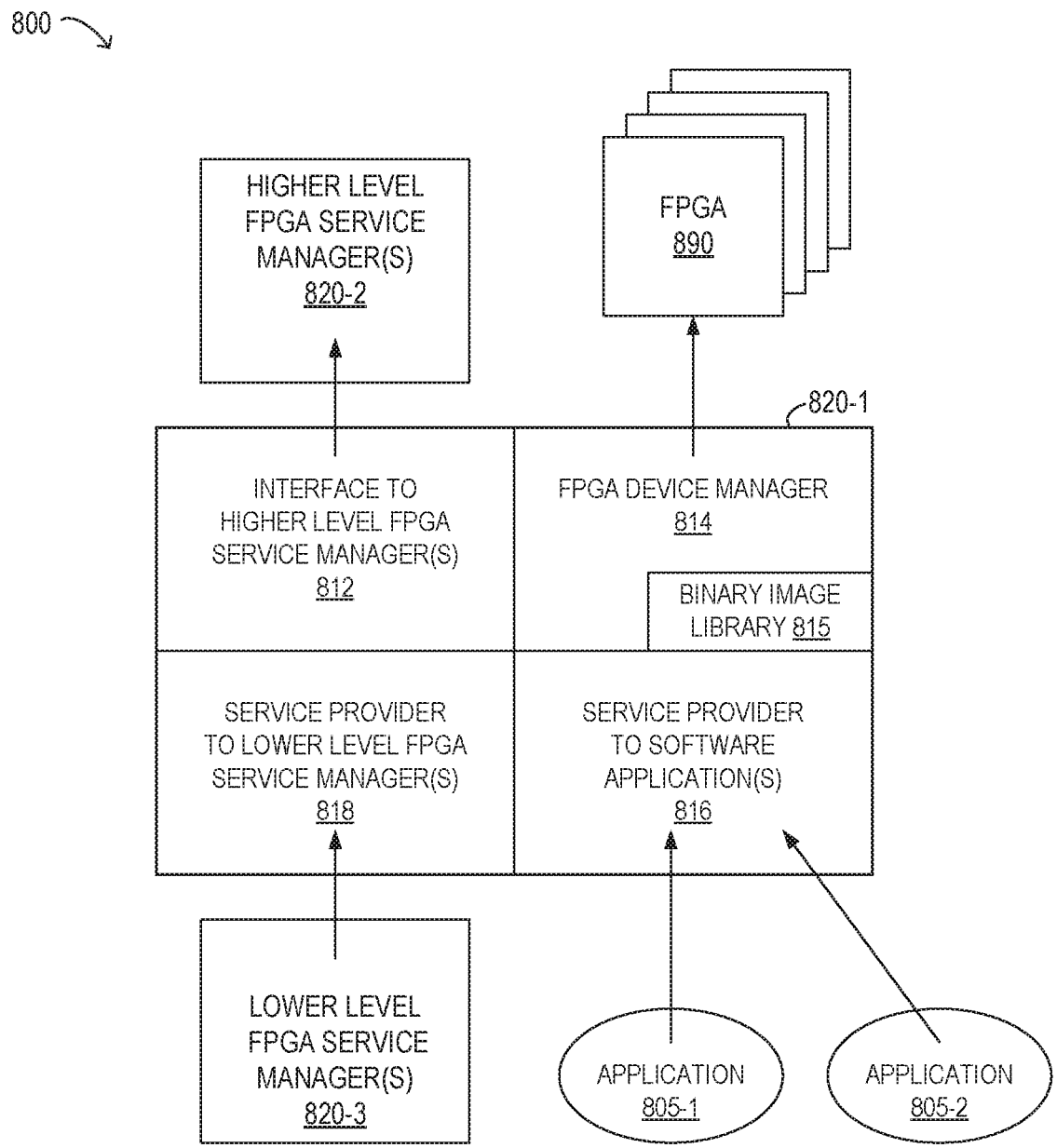
FIG. 8 is a block diagram illustrating selected elements of an embodiment of system including cascaded FPGA service managers.

FIG. 8 is a block diagram illustrating selected elements of an embodiment of system 800 including cascaded FPGA service managers 820, each of which may be the same as or similar to FPGA service manager 220 illustrated in FIG. 2. In FIG. 8, only FPGA service manager 820-1 is shown in detail. In certain embodiments, FPGA service manager 820-2, which operates at a level above FPGA service manager 820-1, and FPGA service manager 820-3, which operates at a level below FPGA service manager 820-1, may include elements similar to those of FPGA service manager 820-1. In the illustrated embodiment, FPGA service manager 820-1 includes an interface to higher level FPGA service managers 812, an FPGA device manager 814, a service provider to lower level FPGA service managers 818, and a service provider to software applications 816. These subsystems are described in more detail below.

FPGA device manager 814: This subsystem may directly interact with local FPGA hardware, e.g., one or more FPGAs 890 that are managed at the level of FPGA service manager 820-1. This subsystem may be directly responsible for loading and unloading bitstreams (binary images) for respective FPGA services into different reconfigurable regions of the FPGAs 890. In certain embodiments, FPGA device manager 814 may monitor performance of, or gather performance data related to, the tasks dispatched to the FPGA services loaded into the FPGAs 890 on behalf of executing software applications. In at least some embodiments, FPGA device manager 814 may also maintain a library of binary images (shown as 815) that can be, or that have been, loaded into the FPGAs 890. FPGA device manager may optionally implement or interact with an FPGA just-in-time compiler to perform certain task, such as translating a binary image from one architecture to another, or re-fitting multiple binary images into a common binary image that consumes a single reconfigurable region, such as one of the FPGA regions 192 illustrated in FIG. 2.

Service provider to software applications 816: This subsystem may interface with multiple applications 805 within the same software layer. Services provided to the applications 805 may include receiving requests to use an FPGA service (e.g., requests to use a named FPGA service, or requests that include binary code to be loaded into an FPGA 890), taking hints for future FPGA service use, and relinquishing the use of an FPGA service (which may allow the reconfigurable region into which a corresponding binary image was loaded to be reclaimed). When used at a hypervisor layer, this subsystem may also interact with the hypervisor for the coordination of virtual machine migrations. In the event that a requested FPGA service cannot be realized with a hardware resource either at the current level or the next higher level, this subsystem may dispatch the requested FPGA service to a CPU executed binary in order to provide transparency of operation. This mechanism is described in more detail below in the context of its application to virtual machine migrations.

Service provider to lower level FPGA service managers 818: This subsystem may communicate with one or more lower level FPGA service managers 820-3. For example, when FPGA service manager 820-1 operates within an FPGA appliance (such as FPGA appliance 730 illustrated in FIG. 7), this subsystem may provide discovery services for FPGA service managers 820 running in one or more servers (such as servers 740 and 750 illustrated in FIG. 7) in accordance with any of a variety of suitable discovery and communication protocols. In another example, when FPGA service manager 820-1 operates within a hypervisor, this subsystem may communicate with other FPGA service managers 820 running within virtual machines (such as any of the virtual machines 105 illustrated in FIG. 1 and FIG. 2), guest operating systems (such as any guest OS 108 illustrated in FIG. 1 or guest OS 708 illustrated in FIG. 7), or native operating system 755.

Interface to higher level FPGA service managers 812: This subsystem may communicate with one or more higher level FPGA service managers 820-2. For example, when FPGA service manager 820-1 operates at an operating system level, this subsystem may discover and communicate with other FPGA service managers 820 across a network or fabric that is located outside the service (e.g., within an FPGA appliance such as FPGA appliance 730 illustrated in FIG. 7), or may discover and communicate with an FPGA service manager 820 operating within a hypervisor via a Virtualization Aware communication path. In certain embodiments, this subsystem may provide to other subsystems an inventory of available upper level resources, and may handle the dispatching of requests to and from subsystems with upper level FPGA service managers 820-2.

Figure 9:
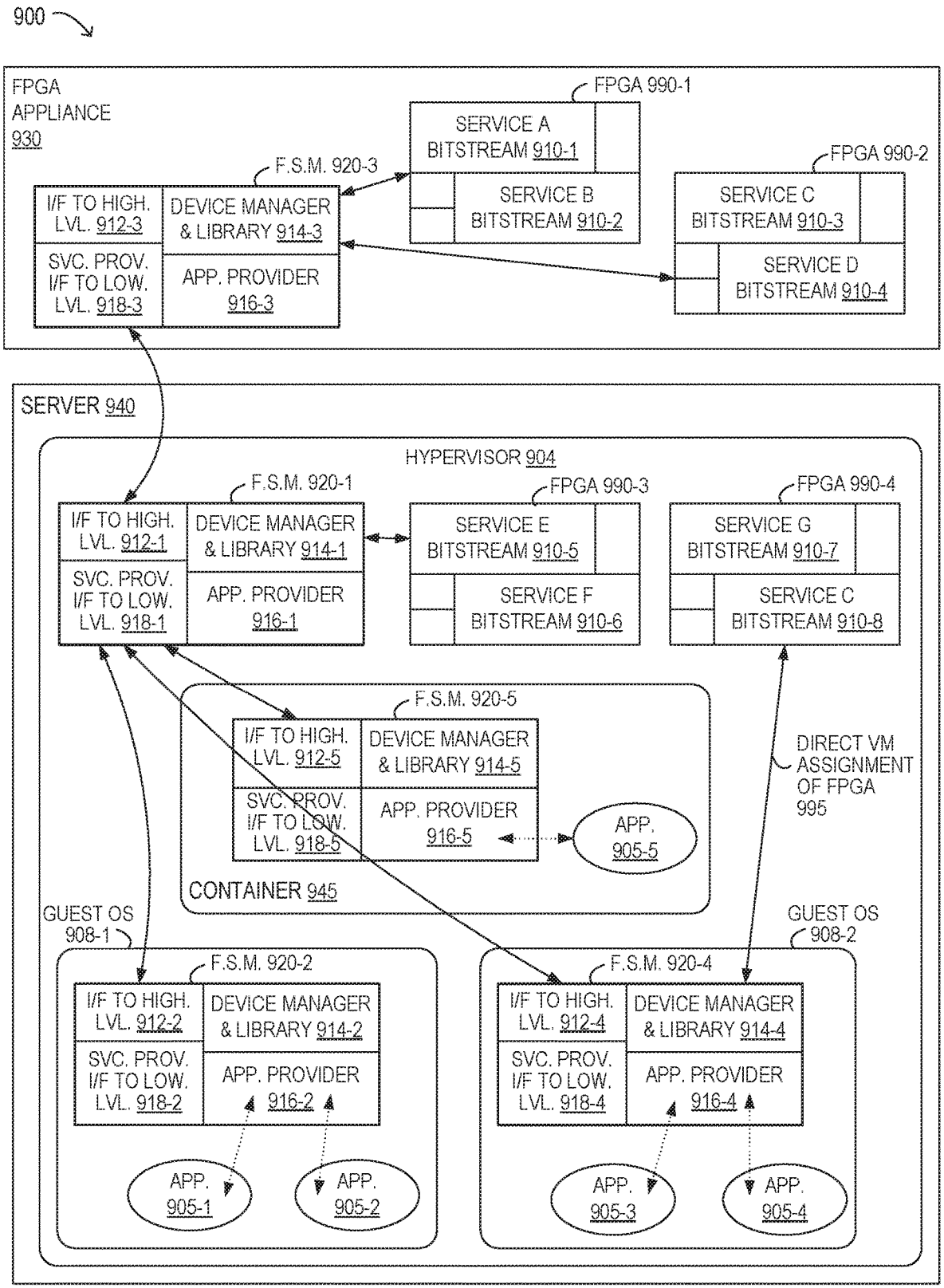
FIG. 9 is a block diagram illustrating selected elements of an embodiment of a system including multiple FPGA service managers hosted at different levels in the software stack.

FIG. 9 is a block diagram illustrating selected elements of an embodiment of a system 900 including multiple FPGA service managers hosted at different levels in the software stack. In this example embodiment, system 900 includes an FPGA appliance 930 and a server 940. FPGA appliance 930 includes an FPGA service manager 920-3 which, as shown, includes subsystems similar to those of FPGA service manager 820-1 illustrated in FIG. 8. For example, FPGA service manager 920-3 includes an interface to higher level FPGA service managers 912-3, an FPGA device manager 914-3, which may include a binary image library, a service provider to lower level FPGA service managers 918-3, and a service provider to software applications 916-3. In this example embodiment, FPGA service manager 920-3 interacts with two FPGAs (shown as 990-1 and 990-2), on which bitstreams for various FPGA services are loaded, through device manager 914-3.

In the example embodiment illustrated in FIG. 9, system 900 includes a server 940 on which a hypervisor 904 is executing. Within hypervisor 904 are two guest operating systems 108 and a container 945. Two software applications 905 are executing within each of the guest operating systems 108. In this example embodiment, four additional FPGA service managers 920 are instantiated at three additional levels, and each includes a respective interface to higher level FPGA service managers 912, a respective FPGA device manager 914, which may include a binary image library, a respective service provider to lower level FPGA service managers 918, and a respective service provider to software applications 916. More specifically, FPGA service manager 920-1 is instantiated at the level of hypervisor 904, FPGA service manager 920-2 is instantiated within guest OS 908-1, FPGA service manager 920-3 is instantiated within guest OS 908-2, and FPGA service manager 920-5 is instantiated within container 945. In this example embodiment, the FPGA service managers 920 instantiated at the level of hypervisor 904 or at levels below hypervisor 904 may cooperate with each other to provide FPGA services for which bitstreams have been loaded into two additional FPGAs (shown as 990-3 and 990-4) to software applications 905 running in guest operation systems 908 and container 945.

In this example, the solid arrows indicate communication between pairs of cascaded FPGA service managers 920 and between the FPGA service managers 920 and various FPGAs 990. More specifically solid arrows indicate communication between service provider to lower level FPGA service managers 918-3 of FPGA service manager 920-3 and interface to higher level FPGA service managers 912-1 of FPGA service manager 920-1, between service provider to lower level FPGA service managers 918-1 of FPGA service manager 920-1 and interface to higher level FPGA service managers 912-2 of FPGA service manager 920-2, between service provider to lower level FPGA service managers 918-1 of FPGA service manager 920-1 and interface to higher level FPGA service managers 912-4 of FPGA service manager 920-4, and between service provider to lower level FPGA service managers 918-1 of FPGA service manager 920-1 and interface to higher level FPGA service managers 912-5 of FPGA service manager 920-5. Solid arrows also indicate communication between device manager 914-3 of FPGA service manager 920-3 and FPGA 990-1, between device manager 914-3 of FPGA service manager 920-3 and FPGA 990-2, between device manager 914-1 of FPGA service manager 920-1 and FPGA 990-3, and between device manager 914-4 of FPGA service manager 920-4 and FPGA 990-4. In the illustrated example, communication between device manager 914-4 of FPGA service manager 920-4 and FPGA 990-4 is implemented as direct VM assignment of FPGA 995.

In an embodiment in which system 900 includes one or more additional FPGA appliances, FPGA service manager 920-1 executing with hypervisor 904 on server 940 may interact with a respective FPGA service manager on each additional FPGA appliance through a service provider to lower level FPGA service managers 918 of an FPGA service manager 920 on the FPGA appliance and through interface to higher level FPGA service managers 912-1 of FPGA service manager 920-1. In an embodiment in which system 900 includes one or more additional servers, each server may interact with FPGA appliance 930 through an interface to higher level FPGA service managers 912 of an FPGA service manager 920 on the server and through service provider to lower level FPGA service managers 918-3 of FPGA service manager 920-3 on FPGA appliance 930.

In the illustrated example, the dotted arrows indicate interactions between various service provider to software applications subsystems 916 and the software applications 905 on whose behalf the FPGA service managers provide access to FPGA services.

Figure 10:
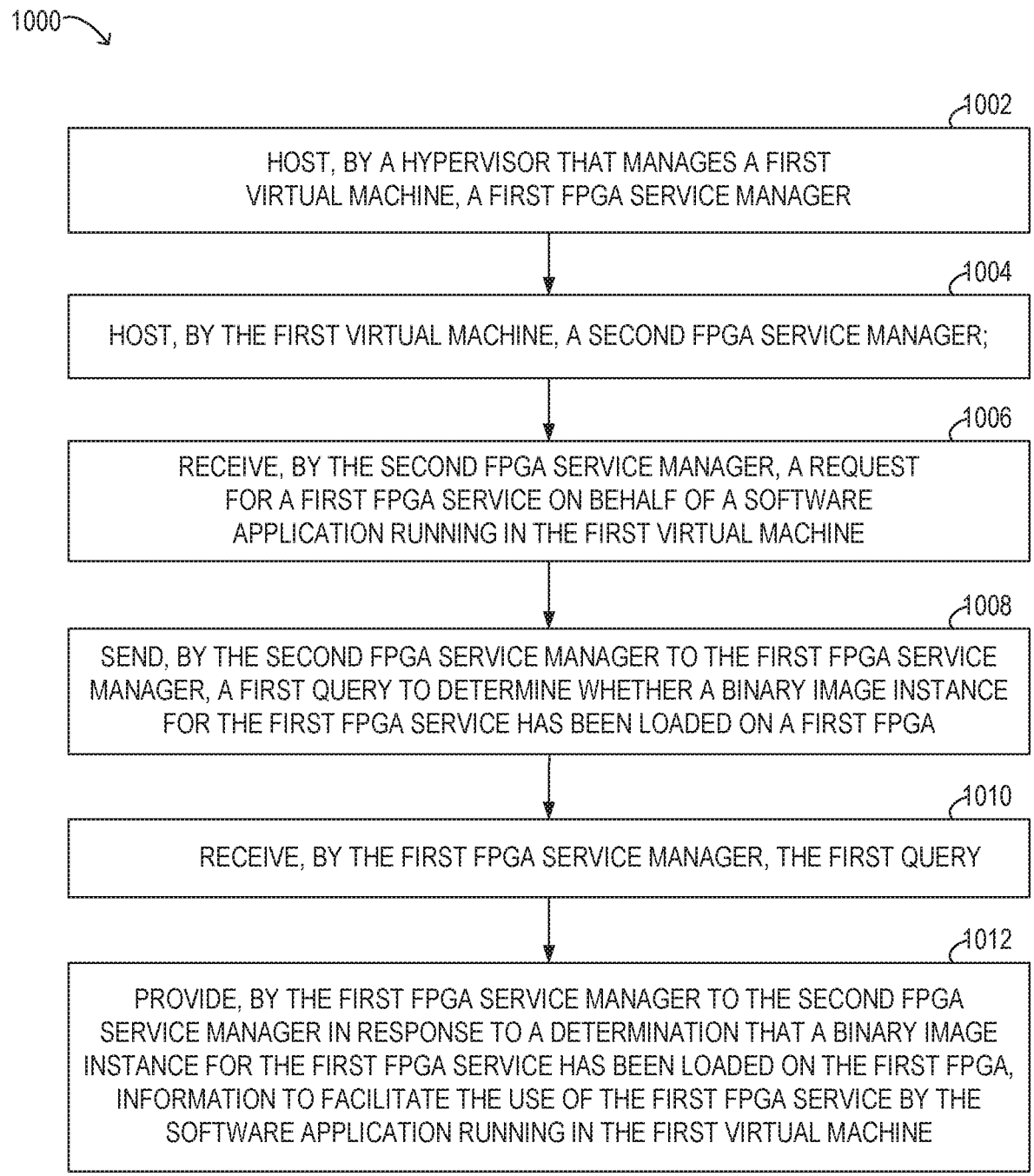
FIG. 10 is a flow diagram illustrating selected elements of an embodiment of a method for coordinating FPGA services using cascaded FPGA service managers.

Referring now to FIG. 10, selected elements of an embodiment of a method 1000 for coordinating FPGA services using cascaded FPGA service managers, as described herein, are depicted in flow diagram form. Method 1000 may be performed using information handling system 100 (see FIGS. 1 and 2), system 700 illustrated in FIG. 7, or system 900 illustrated in FIG. 9, in different embodiments. It is noted that certain operations described in method 1000 may be optional or may be rearranged in different embodiments. Method 1000 may begin, at step 1002, with a hypervisor that manages a first virtual machine hosting a first FPGA service manager. The method may include, at 1004, the first virtual machine hosting a second FPGA service manager.

Method 1000 may include, at 1006, the second FPGA service manager receiving a request for a first FPGA service on behalf of a software application running in the first virtual machine. The method may include, at 1008, the second FPGA service manager sending to the first FPGA service manager a first query to determine whether a binary image instance for the first FPGA service has been loaded on a first FPGA.

Method 1000 may also include, at 1010, the first FPGA service manager receiving the first query and, at 1012, the first FPGA service manager providing to the second FPGA service manager in response to a determination that a binary image instance for the first FPGA service has been loaded on the first FPGA, information to facilitate the use of the first FPGA service by the software application running in the first virtual machine.

Figure 11:
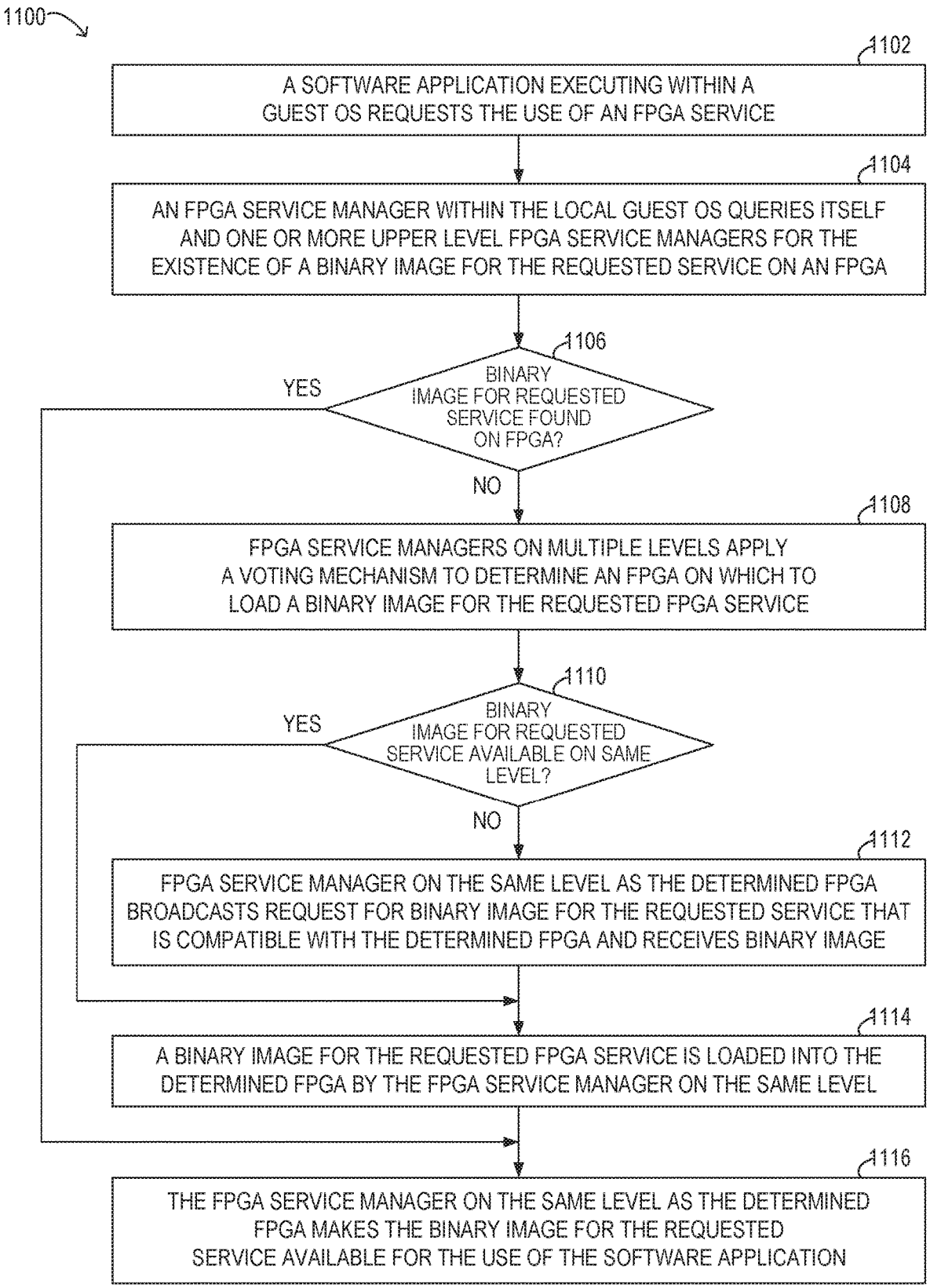
FIG. 11 is a flow diagram illustrating selected elements of an embodiment of a method for using cascaded FPGA service managers to provide a requested service to a software application.

Referring now to FIG. 11, selected elements of an embodiment of a method 1100 for using cascaded FPGA service managers to provide a requested service to a software application, as described herein, are depicted in flow diagram form. Method 1100 may be performed using information handling system 100 (see FIGS. 1 and 2), system 700 illustrated in FIG. 7, or system 900 illustrated in FIG. 9, in different embodiments. It is noted that certain operations described in method 1100 may be optional or may be rearranged in different embodiments. Method 1100 may begin, at step 1102, with a software application executing within a guest OS requesting the use of an FPGA service. For example, software application 905-4 within guest OS 908-2 (illustrated in FIG. 9) may request the use of an FPGA service for which it does not itself maintain a binary image.

The method may include, at 1104, an FPGA service manager within the local guest OS querying itself and one or more upper level FPGA service managers for the existence of a binary image for the requested service on an FPGA. For example, FPGA service manager 920-4 may query itself, as well as FPGA service manager 920-1 and FPGA service manager 920-3, to determine whether a binary image for the requested service has already been loaded on an FPGA in system 900.

If, at 1106, a binary image for the requested service is found on an FPGA, method 1100 may proceed to 1116. Otherwise, method 1100 may proceed to 1108. At 1108, the method may include the FPGA service managers on multiple levels applying a voting mechanism to determine an FPGA on which to load a binary image for the requested FPGA service. In one example, each layer's FPGA service manager may calculate a score for a local placement of the requested FPGA service based on opportunity costs, and may provide this score up and down the chain of cascaded FPGA service managers. The FPGA service may then be instantiated at the layer and FPGA device that has the best score. In this example, if FPGA 990-1 on FPGA appliance 930 yields the best score, FPGA service manager 920-3 may intend to instantiate the requested FPGA service on FPGA 990-1.

The placement of FPGA services on particular local FPGAs and/or remote FPGAs (such as those residing in an FPGA appliance) may be determined through a scoring mechanism that is dependent on any of a variety of scoring factors. In some embodiments, the scoring mechanism may employ a utility function to determine the location at which a given FPGA service would provide the most utility, also known as value, within the ecosystem. In other embodiments, a deficiency function may be employed that focuses on the potential negative effects of particular placement options. In still other embodiments, a combination of utility and deficiency functions may be used to determine the placement of a given FPGA service. Factors considered within such utility and/or deficiency functions may include: 1) the size of the FPGA options, where a larger FPGA may be able to accommodate higher performance services through larger vector and/or pipe-lining stages, 2) the size of the FPGA options, where a smaller FPGA may be able to provide optimal utilization of an FPGA, thus avoiding fragmentation of the resources of the FPGA, 3) the latency of communication with various FPGA options, which may be especially important for FPGAs hosted in FPGA appliances as the fabric for communication may add considerable latency for communication to and from the FPGA, and/or 4) the potential displacement of services already scheduled with various FPGAs. For example, loading a service into an FPGA may require the unloading of another service already in use. The tradeoff between loading a new service and unloading an existing service (which may also use a utility function) may be determined according to which service provides the most benefit. One example method for making this tradeoff includes comparing, for each of the two competing services, the expected or actual time of utilization of the service multiplied by the speed-up factor versus other alternatives (such as offloading the FPGA service for CPU execution, as described herein). In this example, whichever service has the larger product may be considered as providing greater utility (and a lower opportunity cost) than the other and may be scheduled to use the FPGA. In some embodiments, each of one or more scoring factors may be applied to a set of criteria as specified by the FPGA service and/or the application requesting the service.

If, at 1110, a binary image for the requested service is available on the same level as the determined FPGA, method 1100 may proceed to 1114. Otherwise, method 1100 may proceed to 1112. At 1112, the method may include the FPGA service manager on the same level as the determined FPGA broadcasting a request for a binary image for the requested service that is compatible with the determined FPGA and receiving such a binary image. In this example, FPGA service manager 920-3 may or may not have the required binary image in its library. If not, it may broadcast a query for a binary image for the required service and class of FPGA, which may be honored by an FPGA service manager within system 900.

At 1114, method 1100 may include loading a binary image for the requested FPGA service into the determined FPGA, the loading being performed by the FPGA service manager on the same level as the determined FPGA. At 1116, the method may include the FPGA service manager on the same level as the determined FPGA making the binary image for the requested service available for the use of the software application. For example, after acquiring and instantiating the requested FPGA service, FPGA service manager 920-3 may make the service available to others, specifically for the use of FPGA service manager 920-4 and software application 905-4. In some embodiments, this may include exchanging information between FPGA service managers 920-3 and 920-1, and between FPGA service managers 920-1 and 920-4 to facilitate direct communication of software application 905-4 with the FPGA service located at FPGA 990-1.

Figure 12:
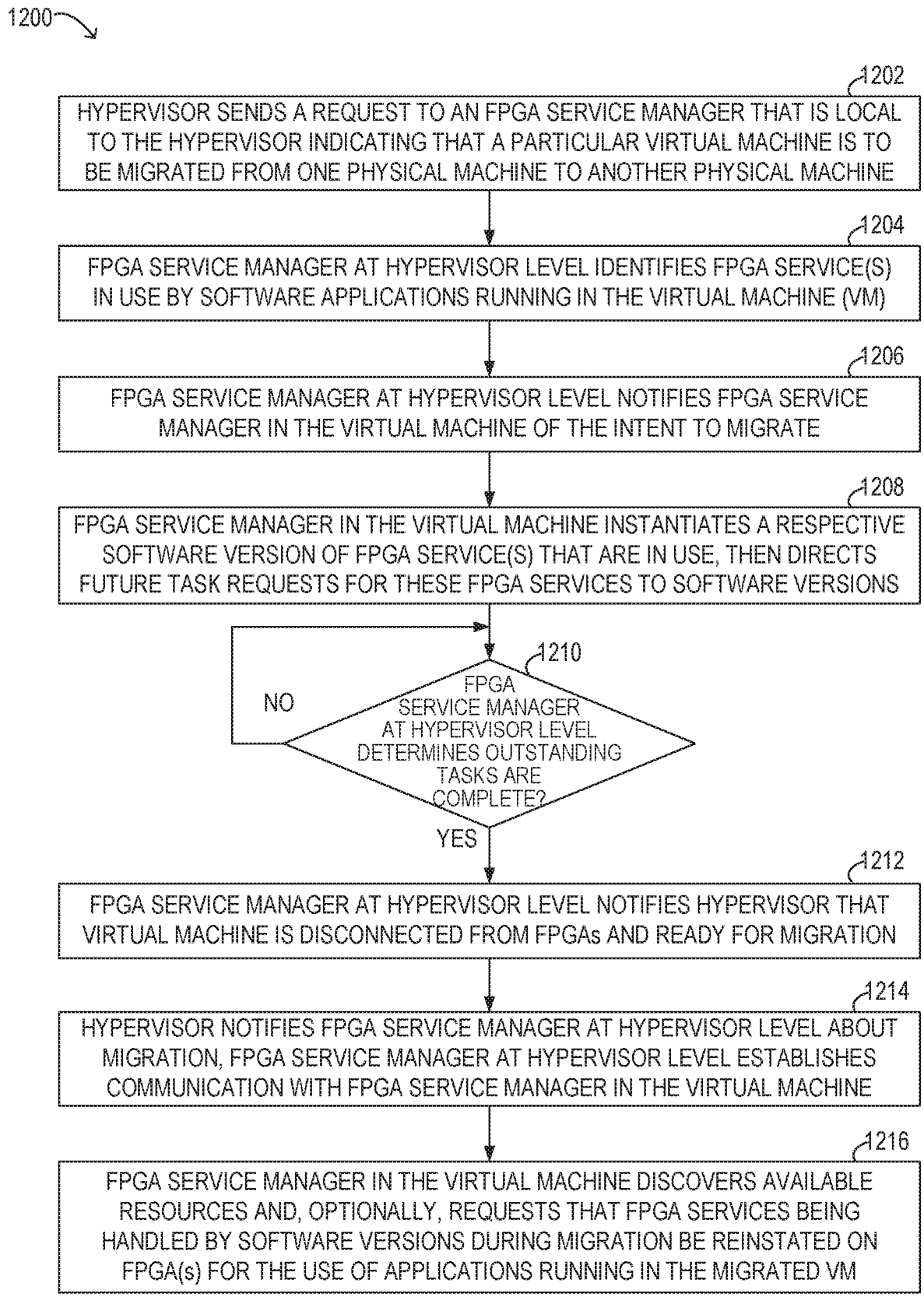
FIG. 12 is a flow diagram illustrating selected elements of an embodiment of a method for effecting a virtual machine migration.

Referring now to FIG. 12, selected elements of an embodiment of a method 1200 for effecting a virtual machine migration, as described herein, are depicted in flow diagram form. method 1200 may be performed using information handling system 100 (see FIGS. 1 and 2), system 700 illustrated in FIG. 7, or system 900 illustrated in FIG. 9, in different embodiments. It is noted that certain operations described in method 1200 may be optional or may be rearranged in different embodiments. method 1200 may begin, at step 1202, with a hypervisor sending a request to an FPGA service manager that is local to the hypervisor indicating that a particular virtual machine is to be migrated from one physical machine to another physical machine. The method may include, at 1204, the FPGA service manager at the hypervisor level identifying the FPGA service(s) that are in use by software applications running in the virtual machine that is to be migrated.

Method 1200 may include, at 1206, the FPGA service manager at the hypervisor level notifying the FPGA service manager in the virtual machine of the intent to migrate the virtual machine. The method may include, at 1208, the FPGA service manager in the virtual machine instantiating a respective software version of the FPGA service(s) that are in use on the virtual machine that is to be migrated, and then directing future task requests received from the software applications running in the virtual machine for these FPGA services to the software versions, which are executed by one or more processors or processor subsystems in the system. If, at 1210, the FPGA service manager at the hypervisor level determines that all outstanding tasks of the FPGA services requested by the software applications running in the virtual machine to be migrated have been completed, method 1200 may proceed to 1212. Otherwise, the method may include waiting until all outstanding tasks of the FPGA services requested by the software applications running in the virtual machine to be migrated have been completed at before proceeding. In some embodiments, determining whether all outstanding tasks of the FPGA services requested by the software applications running in the virtual machine to be migrated have been completed may include explicitly querying the virtual machines that initiated task requests on behalf of software applications, may be based on time-stamps indicating when tasks were initiated, or may be based on other methods. Method 1200 may include, at 1212, the FPGA service manager at the hypervisor level notifying the hypervisor that the virtual machine to be migrated is now disconnected from all FPGAs and is ready to be migrated to a different physical machine.

Method 1200 may include, at 1214, the hypervisor notifying the FPGA service manager at the hypervisor level about the migration of the virtual machine, and the FPGA service manager at the hypervisor level establishing communication with an FPGA service manager in the virtual machine. The method may also include, at 1216, the FPGA service manager in the virtual machine discovering available resources and, optionally, requesting that FPGA services that were being handled by software versions of those services during the migration be reinstated in respective regions of one or more FPGAs for the use of software applications running in the migrated virtual machine.

In certain embodiments, for any given FPGA service, it may be possible to perform the same calculations by executing a software version of the service on a processor or processor subsystem. Executing the software version of the FPGA service may be slower than executing the FPGA service on an FPGA. However, under certain circumstances, or in certain transitory situations, it may be beneficial to offload the FPGA service to a processor or processor subsystem, if an equivalent software version is available for execution. In various embodiments, a transition from FPGA execution of a particular service to processor-software execution of the service may be effected for the purpose of effecting a virtual machine migration, for the purpose of elevating an FPGA service to a higher level at which more applications can utilize the common service, for the purpose of lowering an FPGA service to a lower level to free resources at a higher level, for the purpose of moving an FPGA service to another class of FPGA device for performance or resource-availability reasons, for the purpose of freeing FPGA resources, or for the purpose of on-the-fly fitting to combine one or more FPGA services in a single reconfigurable region of an FPGA.

As described above, an information handling system may include an FPGA and a hypervisor configured to manage one or more virtual machines operating on the information handling system. The hypervisor may include an FPGA service manager configured to receive from a software application running in a virtual machine a request for an FPGA service, to load a bitstream for the service into a first region of the FPGA, to increment a count of concurrent users of the bitstream, to determine, subsequent to a further update to the count, whether the count is zero or non-zero, and to reclaim the first region of the FPGA if the count is zero. The bitstream may be received from the virtual machine or obtained from a catalog of bitstreams maintained on the hypervisor. The FPGA service manager may load a second instance of the bitstream into a second region of the FPGA dependent on execution constraints specified in a bitstream header, or may load a bitstream for a second service into the second region. The bitstream may be selected from among multiple cataloged versions of the bitstream based on the FPGA type.

As described above, an information handling system may include one or more FPGAs, multiple cascaded FPGA service managers, and a hypervisor to manage one or more virtual machines. The hypervisor may host a first FPGA service manager that loads instances of binary images for FPGA services into respective regions of a first FPGA for the benefit of software applications executing in the system. A virtual machine may host a second FPGA service manager that receives a request for an FPGA service from a software application running in the virtual machine, and sends a query to the first FPGA service manager to determine whether a binary image for the requested FPGA service exists on the first FPGA. The first FPGA service manager may receive the query and, if a binary image instance for the requested FPGA service exists on the first FPGA, may provide information to the second FPGA service manager to facilitate the use of the requested FPGA service by the software application running in the virtual machine. The system may also include an FPGA appliance. The FPGA appliance may include one or more additional FPGAs and a third FPGA service manager that loads instances of binary images for FPGA services into respective regions of the additional FPGAs for the benefit of software applications executing in the system. If a binary image instance for the requested FPGA service does not exist on the first FPGA, the first FPGA service manager may send a query to the third FPGA service manager to determine whether a binary image for the requested FPGA service exists on one of the additional FPGAs. If so, the third FPGA service manager may provide information to the first FPGA service manager to facilitate the use of the requested FPGA service by the software application running in the virtual machine.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
    a first field-programmable gate array (FPGA); and
    a hypervisor configured to manage a first virtual machine operating on the information handling system;
    wherein the hypervisor hosts a first FPGA service manager instance configured to load instances of binary images for FPGA services into respective regions of the first FPGA for the benefit of software applications running in the information handling system;
    wherein the first virtual machine hosts a second FPGA service manager instance instantiated at a lower level in a software stack in the information handling system than a level in the software stack at which the first FPGA service manager instance is instantiated, the second FPGA service manager instance configured to:
        receive a request for a first FPGA service on behalf of a software application running in the first virtual machine;
        send a first query to the first FPGA service manager instance to determine whether a binary image instance for the first FPGA service has been loaded on the first FPGA;
    wherein the first FPGA service manager instance is further configured to:
        receive the first query; and
        in response to a determination that a binary image instance for the first FPGA service has been loaded on the first FPGA, provide information to the second FPGA service manager instance to facilitate the use of the first FPGA service by the software application running in the first virtual machine.

2. The information handling system of claim 1, wherein:
    the information handling system has access to an FPGA appliance, wherein the FPGA appliance comprises:
        a second FPGA; and
        a third FPGA service manager instance configured to load instances of binary images for FPGA services into respective regions of the second FPGA, the third FPGA service manager instance instantiated at a higher level in the software stack of the information handling system than the level in the software stack at which the first FPGA service manager instance is instantiated;
    in response to a determination that no binary image instance for the first FPGA service has been loaded on the first FPGA, the first FPGA service manager instance is further configured to:
        send a second query to the third FPGA service manager instance to determine whether a binary image instance for the first FPGA service has been loaded on the second FPGA;
    the third FPGA service manager instance is further configured to:
        receive the second query; and
        in response to a determination that a binary image instance for the first FPGA service has been loaded on the second FPGA, provide information to the first FPGA service manager instance to facilitate the use of the first FPGA service by the software application running in the first virtual machine;
    in response to receiving the information from the third FPGA service manager instance, the first FPGA service manager instance is further configured to provide information to the second FPGA service manager instance to facilitate the use of the first FPGA service by the software application running in the first virtual machine.

3. The information handling system of claim 2, wherein:
    in response to a determination that no binary image instance for the first FPGA service has been loaded on the second FPGA, the first FPGA service manager instance and the third FPGA service manager instance are configured to determine, using a voting mechanism, the one of the first FPGA and the second FPGA on which a binary image instance for the first FPGA service is to be instantiated.

4. The information handling system of claim 3, wherein:
    the voting mechanism comprises:
        determining, by the first FPGA service manager instance, a score for the first FPGA based on an opportunity cost of loading a binary image instance for the first FPGA service into the first FPGA;
        determining, by the third FPGA service manager instance, a score for the second FPGA based on an opportunity cost of loading a binary image instance for the first FPGA service into the second FPGA; and
        comparing the scores for the first FPGA and the second FPGA;
    in response to a determination that the first FPGA has better score than the second FPGA, the first FPGA service manager instance is configured to load a binary image instance for the first FPGA service into a region of the first FPGA; and
    in response to a determination that the second FPGA has better score than the first FPGA, the third FPGA service manager instance is configured to load a binary image instance for the first FPGA service into a region of the second FPGA.

5. The information handling system of claim 2, wherein:
    the FPGA appliance further comprises at least one additional FPGA; and
    the third FPGA service manager instance is further configured to load instances of binary images for FPGA services into respective regions of the at least one additional FPGA.

6. The information handling system of claim 1, wherein:
    the first FPGA, the first virtual machine, and the hypervisor are implemented on a server;
    the hypervisor is further configured to manage one or more additional virtual machines implemented on the server, each of which hosts a respective FPGA service manager instance configured to:

receive requests for FPGA services on behalf of software applications running in the virtual machine; and
send queries to the first FPGA service manager instance to determine whether binary image instances for the requested FPGA services have been loaded on the first FPGA.

7. The information handling system of claim 1, wherein:
the hypervisor is configured to send a request to the first FPGA service manager instance indicating that the first virtual machine is to be migrated from a first physical machine to a second physical machine;
the first FPGA service manager instance is configured to:
identify the first FPGA service as an FPGA service that is in use by the software application running on the first virtual machine;
notify the second FPGA service manager instance that the first virtual machine is to be migrated from the first physical machine to a second physical machine;
the second FPGA service manager instance is configured to:
instantiate, in a memory in response to the notification, a software version of the first FPGA service to be executed by a processor of the information handling system; and
direct requests by the software application for tasks of the first FPGA service to the software version of the first FPGA.

8. The information handling system of claim 1, wherein the second FPGA service manager instance is configured to:
instantiate, in a memory in response to predetermined criteria for offloading the first FPGA service to a processor of the information handling system being met, a software version of the first FPGA service to be executed by the processor, wherein the predetermined criteria is dependent on a performance constraint or a resource utilization constraint; and
direct requests by the software application for tasks of the first FPGA service to the software version of the first FPGA.

9. A method for coordinating services provided by field-programmable gate arrays (FPGAs), comprising:
hosting, by a hypervisor that manages a first virtual machine, a first FPGA service manager instance for loading instances of binary images for FPGA services into respective regions of a first FPGA;
hosting, by the first virtual machine, a second FPGA service manager instance, the second FPGA service manager instance instantiated at a lower level in a software stack than a level in the software stack at which the first FPGA service manager instance is instantiated;
receiving, by the second FPGA service manager instance, a request for a first FPGA service on behalf of a software application running in the first virtual machine;
sending, by the second FPGA service manager instance to the first FPGA service manager instance, a first query to determine whether a binary image instance for the first FPGA service has been loaded on the first FPGA;
receiving, by the first FPGA service manager instance, the first query; and
providing, by the first FPGA service manager instance to the second FPGA service manager instance in response to a determination that a binary image instance for the first FPGA service has been loaded on the first FPGA, information to facilitate the use of the first FPGA service by the software application running in the first virtual machine.

10. The method of claim 9, further comprising:
receiving, by the second FPGA service manager instance, a request for a second FPGA service on behalf of the software application running in the first virtual machine;
sending, by the second FPGA service manager instance to the first FPGA service manager instance, a second query to determine whether a binary image instance for the second FPGA service has been loaded on the first FPGA;
receiving, by the first FPGA service manager instance, the second query; and
sending, by the first FPGA service manager instance to a third FPGA service manager instance of an FPGA appliance comprising a second FPGA in response to a determination that no binary image instance for the second FPGA service has been loaded on the first FPGA, a second query to determine whether a binary image instance for the second FPGA service has been loaded on the second FPGA the third FPGA service manager instance instantiated at a higher level in a software stack than the level in the software stack at which the first FPGA service manager instance is instantiated;
receiving, by the third FPGA service manager instance, the second query;
providing, by the third FPGA service manager instance to the first FPGA service manager instance in response to a determination that a binary image instance for the second FPGA service has been loaded on the second FPGA, information to facilitate the use of the second FPGA service by the software application running in the first virtual machine; and
providing, by the first FPGA service manager instance to the second FPGA service manager instance in response to receiving the information from the third FPGA service manager instance, information to facilitate the use of the second FPGA service by the software application running in the first virtual machine.

11. The method of claim 9, further comprising:
receiving, by the second FPGA service manager instance, a request for a second FPGA service on behalf of the software application running in the first virtual machine;
sending, by the second FPGA service manager instance to the first FPGA service manager instance, a second query to determine whether a binary image instance for the second FPGA service has been loaded on the first FPGA;
receiving, by the first FPGA service manager instance, the second query;
sending, by the first FPGA service manager instance to a third FPGA service manager instance of an FPGA appliance comprising a second FPGA in response to a determination that no binary image instance for the second FPGA service has been loaded on the first FPGA, a second query to determine whether a binary image instance for the second FPGA service has been loaded on the second FPGA;
receiving, by the third FPGA service manager instance, the second query; and
determining, by the first FPGA service manager instance and the third FPGA service manager instance in response to a determination that no binary image instance for the second FPGA service has been loaded on the second FPGA, the one of the first FPGA and the second FPGA on which a binary image instance for the second FPGA service is to be instantiated.

12. The method of claim 11, wherein:
determining the one of the first FPGA and the second FPGA on which a binary image instance for the second FPGA service is to be instantiated comprises:
    determining, by the first FPGA service manager instance, a score for the first FPGA based on an opportunity cost of loading a binary image instance for the second FPGA service into the first FPGA;
    determining, by the third FPGA service manager instance, a score for the second FPGA based on an opportunity cost of loading a binary image instance for the second FPGA service into the second FPGA; and
    comparing the scores for the first FPGA and the second FPGA; and
the method further comprises:
    loading a binary image instance for the second FPGA service into a region of the one of the first FPGA and the second FPGA having a better score.

13. The method of claim 9, wherein:
the first FPGA, the first virtual machine, a second virtual machine that hosts a third FPGA service manager instance, and the hypervisor are implemented on a server; and
the method further comprises:
    receiving, by the third FPGA service manager instance, requests for FPGA services on behalf of software applications running in the second virtual machine; and
    sending, by the third FPGA service manager instance, queries to the first FPGA service manager instance to determine whether binary image instances for the requested FPGA services have been loaded on the first FPGA.

14. The method of claim 9, further comprising:
sending, by the hypervisor to the first FPGA service manager instance, a request indicating that the first virtual machine is to be migrated from a first physical machine to a second physical machine;
identifying, by the first FPGA service manager instance, the first FPGA service as an FPGA service that is in use by the software application running on the first virtual machine;
notifying, by the first FPGA service manager instance, the second FPGA service manager instance that the first virtual machine is to be migrated from the first physical machine to a second physical machine;
instantiating in a memory, by the second FPGA service manager instance in response to the notification, a software version of the first FPGA service to be executed by a processor; and
directing requests by the software application for tasks of the first FPGA service to the software version of the first FPGA.

15. The method of claim 9, further comprising:
instantiating, by the second FPGA service manager instance in a memory in response to predetermined criteria for offloading the first FPGA service to a processor being met, a software version of the first FPGA service to be executed by the processor, wherein the predetermined criteria is dependent on a performance constraint or a resource utilization constraint; and
directing requests by the software application for tasks of the first FPGA service to the software version of the first FPGA.

16. A system, comprising:
one or more processors; and
a memory subsystem, wherein the memory subsystem stores instructions executable by the one or more processors that, when executed by the one or more processors, cause the one or more processors to implement a first field-programmable gate array (FPGA) service manager instance;
wherein the first FPGA service manager instance comprises:
    a first interface through which to communicate with a second FPGA service manager instance instantiated at a higher level in a software stack in the system than a level in the software stack at which the first FPGA service manager instance is instantiated;
    a binary image library in which to store binary images for FPGA services; and
    an FPGA device manager to load instances of binary images for FPGA services into respective regions of a first FPGA for the benefit of software applications executing in the system;
wherein the first FPGA service manager instance is configured to:
    receive a request for a first FPGA service on behalf of a first software application executing at the level in the software stack at which the first FPGA service manager instance is instantiated or at a level in the software stack below the level at which the first FPGA service manager instance is instantiated;
    in response to a determination that a binary image instance for the first FPGA service has been loaded on the first FPGA, facilitate the use of the first FPGA service by the first software application.

17. The system of claim 16, wherein:
the first FPGA service manager instance further comprises:
    a software provider interface to communicate with one or more software applications executing at the level in the software stack at which the first FPGA service manager instance is instantiated;
the first software application executes at the level in the software stack at which the first FPGA service manager instance is instantiated; and
the request for the first FPGA service is received from the first software application through the software provider interface.

18. The system of claim 16, wherein:
the first FPGA service manager instance further comprises:
    a second interface through which to communicate with a third FPGA service manager instance instantiated at a lower level in a software stack in the system than the level in the software stack at which the first FPGA service manager instance is instantiated;
the request for the first FPGA service is received from the third FPGA service manager instance on behalf of the first software application through the second interface.

19. The system of claim 18, wherein:
the first FPGA service manager instance is instantiated within a hypervisor that manages a first virtual machine;
the third FPGA service manager instance is instantiated within the first virtual machine; and the first software application executes within the first virtual machine.

20. The system of claim 16, wherein:
the first FPGA service manager instance is instantiated within an operating system;
the second FPGA service manager instance is instantiated in an FPGA appliance comprising the first FPGA; and
the first software application executes within a container provided by the operating system.

* * * * *